United States Patent
Shahoian et al.

(10) Patent No.: US 6,693,622 B1
(45) Date of Patent: Feb. 17, 2004

(54) VIBROTACTILE HAPTIC FEEDBACK DEVICES

(75) Inventors: Erik J. Shahoian, San Ramon, CA (US); Kenneth M. Martin, Palo Alto, CA (US); Bruce M. Schena, Menlo Park, CA (US); David F. Moore, Redwood City, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/643,898

(22) Filed: Aug. 18, 2000

(51) Int. Cl.[7] .................................................. G09G 5/00
(52) U.S. Cl. .................... 345/156; 345/161; 345/163
(58) Field of Search ................................. 345/156–161, 345/163

(56) References Cited

U.S. PATENT DOCUMENTS

| | | | |
|---|---|---|---|
| 3,832,895 A | 9/1974 | Strandh | 73/133 |
| 3,919,691 A | 11/1975 | Noll | 340/172.5 |
| 4,414,984 A | 11/1983 | Zarudiansky | 128/774 |
| 4,550,617 A | 11/1985 | Fraignier et al. | 73/862.04 |
| 4,604,016 A | 8/1986 | Joyce | 414/7 |
| 4,706,294 A | 11/1987 | Ouchida | 381/109 |
| 4,731,603 A | 3/1988 | McRae et al. | 340/407 |
| 4,795,296 A | 1/1989 | Jau | 414/5 |

(List continued on next page.)

FOREIGN PATENT DOCUMENTS

| | | |
|---|---|---|
| DE | 4400790 A1 | 5/1995 |
| EP | 0265011 | 4/1988 |

(List continued on next page.)

OTHER PUBLICATIONS

Schmult, Brian et al., "Application Areas for a Force–Feedback Joystick," ASME 1993, DSC–vol. 49, pp. 47–54.

(List continued on next page.)

*Primary Examiner*—Steven Saras
*Assistant Examiner*—Srilakshmi Kumar

(57) ABSTRACT

Method and apparatus for controlling magnitude and frequency of vibrotactile sensations for haptic feedback devices. A haptic feedback device, such as a gamepad controller, mouse, remote control, etc., includes a housing grasped by the user, an actuator coupled to the housing, and a mass. In some embodiments, the mass can be oscillated by the actuator and a coupling between the actuator and the mass or between the mass and the housing has a compliance that can be varied. Varying the compliance allows vibrotactile sensations having different magnitudes for a given drive signal to be output to the user grasping the housing. In other embodiments, the actuator is a rotary actuator and the mass is an eccentric mass rotatable by the actuator about an axis of rotation. The eccentric mass has an eccentricity that can be varied relative to the axis of rotation while the mass is rotating. Varying the eccentricity allows vibrotactile sensations having different magnitudes for a given drive signal to be output to the user grasping the housing.

21 Claims, 13 Drawing Sheets

U.S. PATENT DOCUMENTS

| | | | |
|---|---|---|---|
| 4,823,634 A | 4/1989 | Culver | 74/471 XY |
| 4,868,549 A | 9/1989 | Affinito et al. | 340/710 |
| 4,885,565 A | 12/1989 | Embach | 340/407 |
| 4,933,584 A | 6/1990 | Harms et al. | 310/162 |
| 4,983,901 A | 1/1991 | Lehmer | 318/685 |
| 5,103,404 A | 4/1992 | McIntosh | 318/568.22 |
| 5,107,080 A | 4/1992 | Rosen | 200/6 A |
| 5,107,262 A | 4/1992 | Cadoz et al. | 341/22 |
| 5,136,194 A | 8/1992 | Oudet et al. | 310/15 |
| 5,146,566 A | 9/1992 | Hollis, Jr. et al. | 395/275 |
| 5,184,319 A | 2/1993 | Kramer | 364/806 |
| 5,186,629 A | 2/1993 | Rohen | 434/114 |
| 5,203,563 A | 4/1993 | Loper, III | 273/148 |
| 5,296,871 A | 3/1994 | Paley | 345/163 |
| 5,334,893 A | 8/1994 | Oudet et al. | 310/38 |
| 5,354,162 A | 10/1994 | Burdea et al. | 414/5 |
| 5,388,992 A | 2/1995 | Franklin et al. | 434/114 |
| 5,399,091 A | 3/1995 | Mitsumoto | 434/61 |
| 5,405,152 A | 4/1995 | Katanics et al. | 273/438 |
| 5,440,183 A | 8/1995 | Denne | 310/12 |
| 5,489,812 A | 2/1996 | Furuhata et al. | 310/309 |
| 5,565,840 A | 10/1996 | Thorner et al. | 340/407.1 |
| 5,580,251 A | 12/1996 | Gilkes et al. | 434/113 |
| 5,583,478 A | 12/1996 | Renzi | 340/407.1 |
| 5,587,937 A | 12/1996 | Massie et al. | 364/578 |
| 5,589,828 A | 12/1996 | Armstrong | 341/20 |
| 5,619,180 A | 4/1997 | Massimino et al. | 340/407.1 |
| 5,631,861 A | 5/1997 | Kramer | 364/406 |
| 5,643,087 A | 7/1997 | Marcus et al. | 463/38 |
| 5,656,901 A | 8/1997 | Kurita | 318/436 |
| 5,661,446 A | 8/1997 | Anderson et al. | 335/229 |
| 5,669,818 A | 9/1997 | Thorner et al. | 463/30 |
| 5,684,722 A | 11/1997 | Thorner et al. | 364/578 |
| 5,691,747 A | 11/1997 | Amano | 345/167 |
| 5,696,537 A | 12/1997 | Solhjell | 345/164 |
| 5,709,219 A | 1/1998 | Chen et al. | 128/782 |
| 5,714,978 A | 2/1998 | Yamanaka et al. | 345/157 |
| 5,721,566 A | 2/1998 | Rosenberg et al. | 345/161 |
| 5,734,373 A | 3/1998 | Rosenberg et al. | 345/161 |
| 5,736,978 A | 4/1998 | Hasser et al. | 345/173 |
| 5,739,811 A * | 4/1998 | Rosenberg et al. | 345/161 |
| 5,742,278 A | 4/1998 | Chen et al. | 345/156 |
| 5,754,023 A | 5/1998 | Roston et al. | 318/561 |
| 5,755,577 A | 5/1998 | Gillio | 434/262 |
| 5,767,839 A | 6/1998 | Rosenberg | 345/161 |
| 5,781,172 A | 7/1998 | Engel et al. | 345/164 |
| 5,784,052 A | 7/1998 | Keyson | 345/167 |
| 5,790,108 A | 8/1998 | Salcudean et al. | 345/184 |
| 5,805,140 A * | 9/1998 | Rosenberg et al. | 345/156 |
| 5,821,920 A | 10/1998 | Rosenberg et al. | 345/156 |
| 5,857,986 A | 1/1999 | Moriyasu | 601/49 |
| 5,889,672 A | 3/1999 | Schuler et al. | 364/188 |
| 5,894,263 A | 4/1999 | Shimakawa et al. | 340/388.1 |
| 5,897,437 A | 4/1999 | Nishiumi et al. | 463/47 |
| 5,903,085 A | 5/1999 | Karam | 310/328 |
| 5,914,705 A | 6/1999 | Johnson et al. | 345/163 |
| 5,945,772 A | 8/1999 | Macnak et al. | 310/326 |
| 5,956,016 A | 9/1999 | Kuenzner et al. | 345/156 |
| 5,973,670 A | 10/1999 | Barber et al. | 345/157 |
| 5,979,892 A | 11/1999 | Smith | 271/267 |
| 5,984,880 A | 11/1999 | Lander et al. | 600/595 |
| 5,986,643 A | 11/1999 | Harvill et al. | 345/156 |
| 6,001,014 A | 12/1999 | Ogata et al. | 463/37 |
| 6,002,184 A | 12/1999 | Delson et al. | 310/14 |
| 6,004,134 A | 12/1999 | Marcus et al. | 434/45 |
| 6,044,646 A | 4/2000 | Silverbrook | 60/528 |
| 6,078,126 A | 6/2000 | Rollins et al. | 310/330 |
| 6,088,017 A * | 7/2000 | Tremblay et al. | 345/156 |
| 6,088,019 A | 7/2000 | Rosenberg | 345/156 |
| 6,100,874 A | 8/2000 | Schena et al. | 345/157 |
| 6,104,158 A | 8/2000 | Jacobus et al. | 318/568.11 |
| 6,104,382 A | 8/2000 | Martin et al. | 345/161 |
| 6,154,201 A | 11/2000 | Levin et al. | 345/184 |
| 6,184,868 B1 | 2/2001 | Shahoian et al. | 345/161 |
| 6,198,206 B1 | 3/2001 | Saarmaa et al. | 310/340 |
| 6,211,861 B1 | 4/2001 | Rosenberg et al. | 345/163 |
| 6,256,011 B1 | 7/2001 | Culver | 345/157 |
| 6,275,213 B1 | 8/2001 | Tremblay et al. | 345/156 |
| RE37,374 E | 9/2001 | Roston et al. | 318/561 |
| 6,317,032 B1 | 11/2001 | Oishi | 340/311.1 |
| 6,424,333 B1 | 7/2002 | Tremblay et al. | |

FOREIGN PATENT DOCUMENTS

| | | |
|---|---|---|
| EP | 0626634 A2 | 5/1994 |
| EP | 0607580 A1 | 7/1994 |
| GB | 2347199 | 8/2000 |
| JP | S62-194389 | 12/1987 |
| JP | 07096016 | 4/1991 |
| JP | 4008381 | 1/1992 |
| JP | 702147 | 1/1995 |
| WO | WO92/00559 | 1/1992 |
| WO | WO 97/31333 | 8/1997 |
| WO | WO98/32112 | 7/1998 |
| WO | WO99/40504 | 8/1999 |
| WO | WO00/03319 | 1/2000 |
| WO | WO 01/03105 | 1/2001 |
| WO | WO 01/13354 | 2/2001 |
| WO | WO 01/24158 | 4/2001 |

OTHER PUBLICATIONS

Hasser, Christopher John, "Tactile Feedback for a Force–Reflecting Haptic Display," The School of Engineering, University of Dayton, Dec. 1995, pp. iii–xii & 1–96.

Akamatsu, M. et al., "Multimodal Mouse: A Mouse–Type Device with Tactile and Force Display," Presence, vol. 3, No. 1, 1994, pp. 73–80.

Kelley, A. J. et al., "MagicMouse: Tactile and Kinesthetic Feedback in the Human–Computer Interface using an Electromagnetically Actuated Input/Output Device," Dept. of Elec. Eng., Univ. of Brit. Columbia, 1993, pp. 1–27.

Hasser, C. et al., "Tactile Feedback with Adaptive Controller for a Force–Reflecting Haptic Display," Parts 1&2, IEEE 0–7803–3131–1, 1996, pp. 526–533.

Ramstein, C., "Combining Haptic and Braille Technologies: Design Issues and Pilot Study," Assets '96 , $2^{nd}$ Annual ACM Conf. on Assistive Technologies, 1996, pp. 37–44.

Dennerlein, et al., "Vibrotactile Feedback for Industrial Telemanipulators," ASME IMECE, $6^{th}$ Annual Symp. On Haptic Interfaces for Virtual Environment and Teleoperator Systems, Nov. 1997, pp. 1–7.

Minsky, Margaret et al., "Feeling and Seeing: Issues in Force Display," ACM 089791–351–5, 1990, pp. 235–242.

Ouh–young, M. et al., "Creating an Illustion of Feel: Control Issues in Force Display," Computer Science Dept., Univ of N. Carolina, 1989, pp. 1–14.

Hasser, C., "Force–Reflecting Anthropomorphic Hand Masters," AL/CF–TR–1995–0110, 1995, pp. 5–31.

Kim, Won, "Telemanipulator Technology and Space Telerobotics," SPIE Proceedings, 1993, vol. 2057, pp. 40–50.

Kaczmarek, K. et al., "Tactile Displays," Virtual Environments and Advanced Interface Design, edited Barfield et al., 1995, pp. 349–414.

Patrick, N. et al., "Design and Testing of a Non-reactive, fingertip, tactile display for interaction with remote environments," Cooperative Intelligent Robotics in Space, SPIE Proceedings, vol. 1387, 1990, pp. 215–222.

Iwata, H., "Artificial Reality with Force–Feedback: Development of Desktop Virtual Space with Compact Master Manipulator," Computer Graphics, vol. 24, No. 4, 1990, pp. 165–170.

Russo, M., "The Design and Implementation of a Three Degree-of-Freedom Force Output Joystick," Dept of Mech. Eng., 1990, pp. 1–40.

Slocum, A., *Precision Machine Design*, Prentice Hall, pp. 661, 664.

* cited by examiner

VIBROTACTILE HAPTIC FEEDBACK DEVICES

CROSS REFERENCE TO RELATED APPLICATIONS

This application claims priority to U.S. Provisional Application No. 60/149,782, filed Aug. 18, 1999, entitled "Vibration Force Feedback Device Implementations," and which is incorporated by reference herein, and this application is a continuation-in-part of copending U.S. patent application Ser. No. 09/608,125, filed Jun. 30, 2000, entitled, "Controlling Vibrotactile Sensations for Haptic Feedback Devices," which claims priority to U.S. Provisional Application No. 60/142,155, filed Jul. 1, 1999, all of which are incorporated by reference herein.

Certain inventions described herein were made with Government support under Contract Number N00014-98-C-0220, awarded by the Office of Naval Research. The Government has certain rights in these inventions.

BACKGROUND OF THE INVENTION

The present invention relates generally to producing forces in haptic feedback interface devices, and more particularly to the output and control of vibrations and similar force sensations from actuators in a haptic feedback interface device.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, force feedback or tactile feedback is also provided to the user, also known more generally herein as "haptic feedback." These types of interface devices can provide physical sensations which are felt by the user using the controller or manipulating the physical object of the interface device. One or more motors or other actuators are used in the device and are connect ed to the controlling computer system. The computer system controls forces on the haptic feedback device in conjunction and coordinated with displayed events and interactions on the host by sending control signals or commands to the haptic feedback device and the actuators.

Many low cost haptic feedback devices provide forces to the user by vibrating the manipulandum and/or the housing of the device that is held by the user. The output of simple vibration haptic feedback (tactile sensations) requires less complex hardware components and software control over the force-generating elements than does more sophisticated haptic feedback. For example, in many current game controllers for game consoles such as the Sony Playstation and the Nintendo 64, one or more motors are mounted in the housing of the controller and which are energized to provide the vibration forces. An eccentric mass is positioned on the shaft of each motor, and the shaft is rotated unidirectionally to cause the motor and the housing of the controller to vibrate. The host computer (console unit) provides commands to the controller to turn the vibration on or off or to increase or decrease the frequency of the vibration by varying the rate of rotation of the motor.

One problem with these currently-available implementations of vibration haptic feedback devices is that the vibrations that these implementations produce are very limited and cannot be significantly varied. For example, the frequency of the vibrations output by the controllers described above can be adjusted by the host computer, but the magnitude of these vibrations cannot be varied independently from the frequency. These devices can only provide vibration magnitudes that are directly proportional to frequency.

In addition, other prior art vibrotactile devices are limited in their ability to change the natural frequency of a moving mass in the actuator system, which is the frequency at which the magnitude of the output vibrations are the highest for a given power input. If the natural frequency can be varied, the resulting magnitude of vibrations can be greatly varied. The prior art devices thus severely limit the force feedback effects which can be experienced by a user of these devices.

SUMMARY OF THE INVENTION

The present invention is directed to controlling vibrotactile sensations in haptic feedback devices which are interfaced with a host application program. The present invention allows more varied and complex sensations to be provided using inexpensive electronics and mechanical parts.

More specifically, in one aspect of the present invention, a haptic feedback device for providing vibrotactile sensations to a user is coupled to a host computer. The haptic feedback device, such as a gamepad controller, mouse, remote control, etc., includes a housing grasped by the user, an actuator coupled to the housing, and a mass. The mass can be oscillated by the actuator and a coupling between the actuator and the mass or between the mass and the housing has a compliance that can be varied. Varying the compliance allows vibrotactile sensations having different magnitudes for a given drive signal to be output to the user grasping the housing.

Several different embodiments realize this aspect of the invention. In one embodiment, the compliance is contributed by a magnetic spring provided between the actuator and the mass, where the actuator includes a magnet and a coil, and where the mass is coupled to a pivoting member that includes at least one magnet that is moved by a magnetic field of the actuator. In another embodiment, the compliance is provided by a flexure coupling the mass to the housing, where the actuator is grounded to the housing and moves the mass which includes a magnet. A second grounded actuator can provide a magnetic force on the mass to provide a variable tension in the flexure. In other embodiments, the flexible member is a tapered member and is coupled to a rotary actuator that rotates the tapered member about its lengthwise axis to provide a variable compliance between the mass and housing. In other embodiments, the compliance is varied by moving a pair of grounded pincher rollers along a length of the flexible member.

In another aspect of the present invention, a haptic feedback device for providing vibrotactile sensations to a user is coupled to a host computer and includes a housing grasped by the user, a rotary actuator coupled to the housing, and an eccentric mass coupled to and rotatable by the actuator about an axis of rotation. The eccentric mass has an eccentricity that can be varied relative to the axis of rotation while the mass is rotating. Varying said eccentricity allows vibrotactile sensations having different magnitudes for a given drive signal to be output to the user grasping said housing.

Several different embodiments realize this aspect of the invention. In one embodiment, the eccentric mass includes a plurality of discs slidably coupled to a rotating shaft, where a magnetic field is controlled to cause a desired number of said discs to frictionally engage with said shaft to provide a desired eccentricity of the mass. In another embodiment, the mass includes a slotted member having a plurality of different slots radiating from a center aperture and having different lengths, where a rotated keyed portion engages in one of the slots to provide a desired eccentricity. In another embodiment, the mass includes a ring magnet coupled to a hub, where a magnetic field is provided to move the ring magnet relative to the axis of rotation and relative to the hub to vary the eccentricity. In another embodiment, the mass includes a hopper that encloses multiple balls, and where an inlet to the hopper can be opened to allow additional balls to move inside the hopper and change a center of mass of the hopper to change the eccentricity. In another embodiment, the mass includes a rotating disc having sockets, where at least one ball can be pulled into one of the sockets by a selective magnetic field, thereby changing a center of mass of the disc to change the eccentricity. In another embodiment, the mass includes an arm member coupled to a rotating shaft of the actuator, where a member is pivotably coupled to the arm such that a different eccentricity is provided when rotating the arm in one direction than when rotating the arm in the opposite direction.

The present invention advantageously provides a haptic feedback device that can output a wide variety of vibrotactile sensations. Both the frequency and amplitude of the vibrations can be controlled using bidirectional control features. Furthermore, a compliance between mass and ground and/or an eccentricity of the moving mass can be changed to change the natural frequency of oscillation of the mass, providing different vibration magnitudes for a given drive waveform. These features allow a much more efficient use of power for a desired vibration magnitude, a greater precision in the control of vibration sensations, and a wider range of sensations to be experienced by the user than in the prior art devices.

These and other advantages of the present invention will become apparent to those skilled in the art upon a reading of the following specification of the invention and a study of the several figures of the drawing.

BRIEF DESCRIPTION OF THE DRAWINGS

FIG. 3b is a graph showing exemplary current waveforms to drive the actuator of FIG. 3a;

FIG. 7b is a top plan view of a rotatable disc used in the embodiment of FIG. 7a;

FIG. 8b is a cross-sectional top plan view of a keyed flat portion used in the embodiment of FIG. 8a;

FIG. 8c is a top plan view of the slotted member and spindle of the embodiment of FIG. 8a;

FIG. 11b is a top plan view of a rotating disc of the embodiment of FIG. 11a;

DETAILED DESCRIPTION OF PREFERRED EMBODIMENTS

Figure 1:
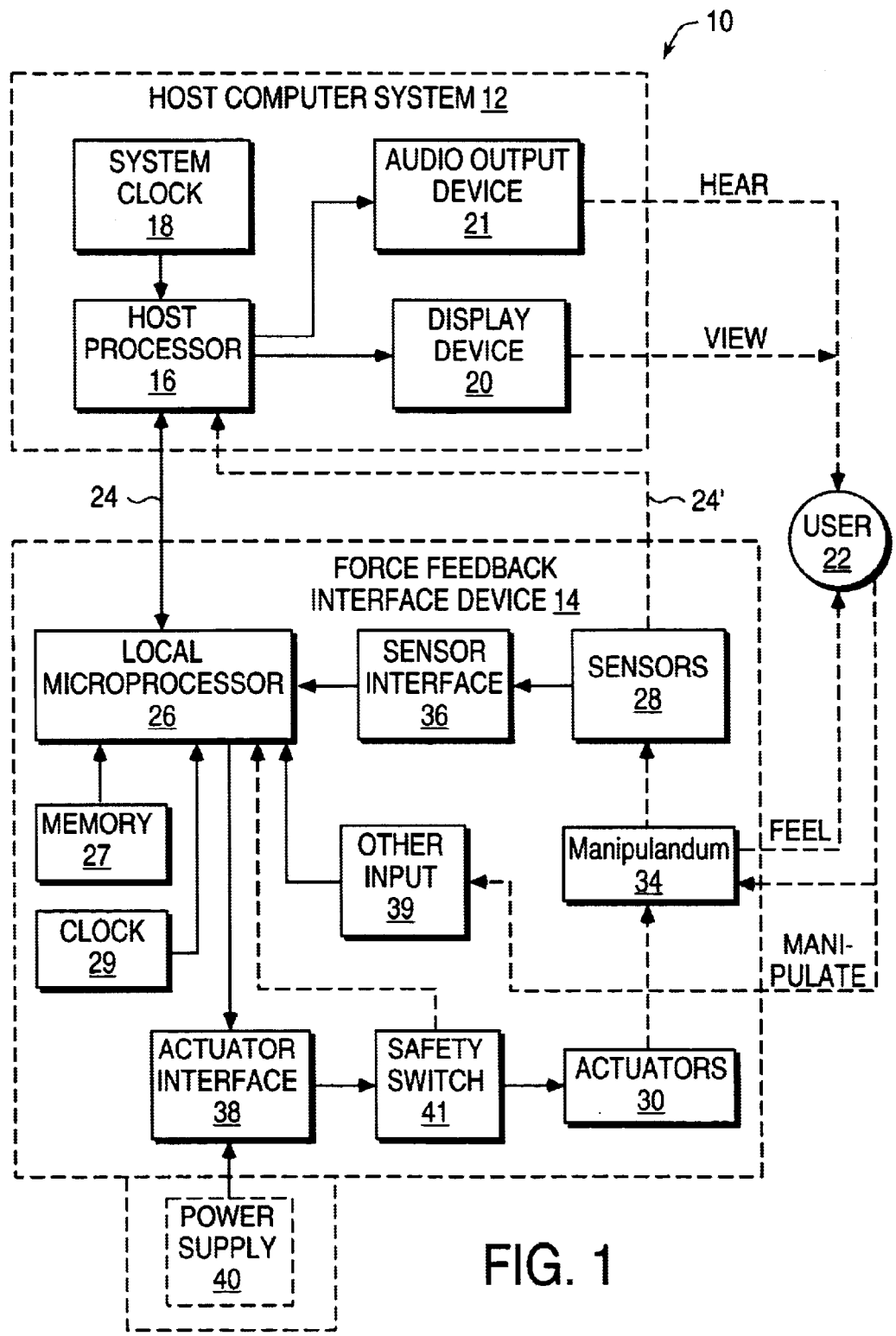
FIG. 1 is a block diagram of a haptic feedback system suitable for use with the present invention.

FIG. 1 is a block diagram illustrating a force feedback interface system 10 for use with the present invention controlled by a host computer system. Interface system 10 includes a host computer system 12 and an interface device 14.

Host computer system 12 can be any of a variety of computer systems, such as a home video game systems (game console), e.g. systems available from Nintendo, Sega, or Sony. Other types of computers may also be used, such as a personal computer (PC, Macintosh, etc.), a television "set top box" or a "network computer," a workstation, location-based arcade game, a portable and/or handheld game device or computer, etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals. The host application, or a driver program, API or other layer running on the host computer, preferably sends out information to cause haptic feedback to the user on the device 14, as described below, based on events or interactions occurring within the host application. For example, when a user-controlled vehicle collides with a fence in a game or simulation, a vibration can be output to the user to enhance the interactive experience of the collision. Similarly, when a user-controlled cursor moves onto another object such as an icon or text heading, vibrations can be used to inform the user of the interaction.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, television, CRT, flat-panel display, 2-D or 3-D display goggles, or any other visual interface. Audio output device 21, such as speakers, is preferably coupled to host microprocessor 16 via amplifiers, filters, and other circuitry well known to those skilled in the art and provides sound output to user 22 from the host computer 12. Other types of peripherals can also be coupled to host processor 16, such as storage devices (hard disk drive, CD ROM/DVD-ROM drive, floppy disk drive, etc.), communication devices, printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. Interface device 14 can be a gamepad controller, joystick controller, mouse controller, steering wheel controller, remote control, or other device which a user may manipulate to provide input to the computer system and experience force feedback. The interface device has a housing through which the vibrations of the device are transmitted to the user. The user can grasp. (hold in the hand between two or more fingers, between one or more fingers and the palm, or in the palm) the housing to feel the vibrotactile forces.

The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 includes a local microprocessor 26, sensors 28, actuators 30, a user object 34, optional sensor interface 36, an actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 can operate independently of host computer 12 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 can manage low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Alternatively, the interface device can output vibrotactile forces based directly on force values streamed from the host to the device or based on other low-level values computed by the host. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, can be coupled to microprocessor 26 in interface device 14 to store instructions for microprocessor 26 and store temporary and other data (and/or registers of the microprocessor 26 can store data). In addition, a local clock 29 can be coupled to the microprocessor 26 to provide timing data.

Sensors 28 sense the position, motion, and/or other characteristics of a user manipulandum 34 of the interface device 14 along one or more degrees of freedom and provide signals to microprocessor 26 including information representative of those characteristics. Rotary or linear optical encoders, potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12. For example, these sensor signals can be used by the host computer to influence the host application program, e.g. to steer a race car in a game or move a cursor across the screen.

One or more actuators 30 transmit forces to the interface device 14 and/or to manipulandum 34 of the interface device 14 in response to signals received from microprocessor 26. In preferred embodiments, the actuators output vibrotactile forces on the housing (or a portion thereof) of the interface device 14 which is handheld by the user, so that the forces are transmitted to the manipulandum through the housing. Alternatively or additionally, actuators can be directly coupled to the manipulandum 34 to provide vibrotactile forces thereon. Furthermore, kinesthetic forces in the degrees of freedom of the user manipulandum can additionally be provided in some embodiments. Actuators 30 can include two types: active actuators and passive actuators. Active actuators include linear current control motors, stepper motors, pneumatic/hydraulic active actuators, a torquer (motor with limited angular range), voice coil actuators, moving magnet actuators, and other types of actuators that transmit a force to move an object. Passive actuators can also be used for actuators 30, such as magnetic particle brakes, friction brakes, or pneumatic/hydraulic passive actuators. Active actuators are preferred in the embodiments of the present invention. Actuator interface 38 can be connected between actuators 30 and microprocessor 26 to convert signals from microprocessor 26 into signals appropriate to drive actuators 30, as is described in greater detail below.

Other input devices 39 can optionally be included in interface device 14 and send input signals to microprocessor 26 or to host processor 16. Such input devices can include buttons, dials, switches, levers, or other mechanisms. For example, in embodiments where the device 14 is a gamepad, the various buttons and triggers can be other input devices 39. Alternatively, if the user manipulandum 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum (or "user object") 34 is a physical object, device or article that may be grasped or otherwise contacted or controlled by a user and which is coupled to interface device 14. In some embodiments, the user 22 can manipulate and move the manipulandum along provided degrees of freedom to interface with the host application program the user is viewing on display screen 20. Manipulandum 34 in such embodiments can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object. Mechanisms can be used to provide degrees of freedom to the manipulandum, such as gimbal mechanisms, slotted yoke mechanisms, flexure mechanisms, etc. Some embodiments of suitable mechanisms are described in U.S. Pat. Nos. 5,767,839; 5,721,566; 5,623, 582; 5,805,140; and 5,825,308.

In preferred embodiments, the haptic feedback can be output directly on the housing of a device, such as a handheld device, or on the manipulandum 34. For example, the housing can be used for a gamepad, mouse, remote control, telephone, or other handheld device. In a gamepad embodiment, the housing of the gamepad can receive the vibrotactile feedback of the present invention, and a fingertip joystick or other control on the gamepad can be provided with separate haptic feedback, e.g. with motors coupled to the joystick mechanism to provide force feedback in the degrees of freedom of the joystick, and/or tactile feedback. Some gamepad embodiments may not include a joystick, so that manipulandum 34 can be a button pad or other device for inputting directions or commands to the host computer.

Controlling Force Feedback Vibrations

The present invention provides control over vibrotactile feedback using an actuator having a moving mass. In most of the described implementations, the moving mass is rotated by a rotary actuator. A basic implementation of rotary actuator and eccentric mass is described below, with many different implementations following.

Figure 2A:
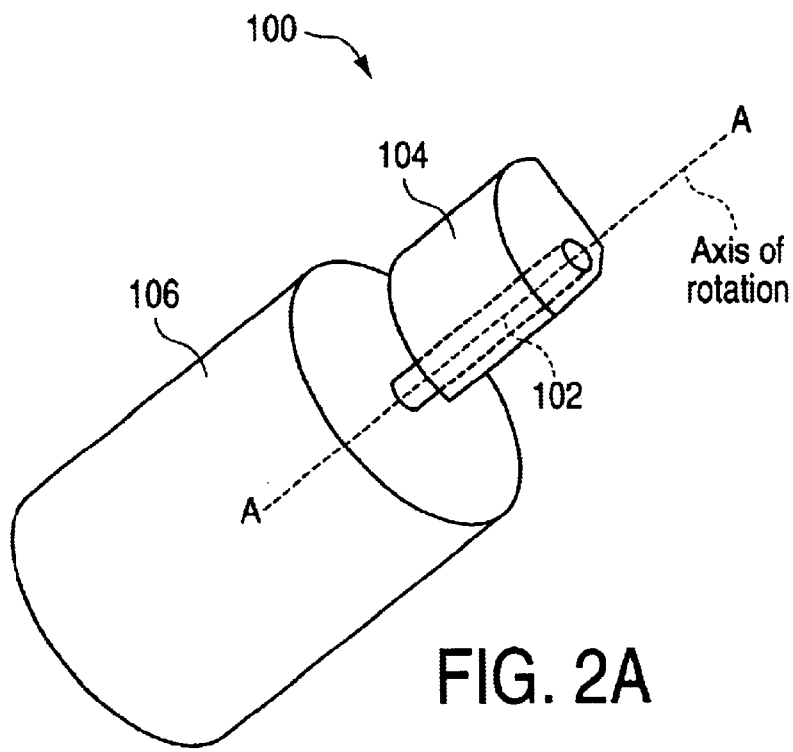
FIG. 2a is a perspective view of one embodiment of a motor having an eccentric mass that is rotated to provide vibrations to an interface device.

FIG. 2a is a graph illustrating a DC rotary motor 100 that can be included in a handheld controller 14 or coupled to manipulandum 34 as actuator 30 for providing force feedback to the user of the controller 14 and/or manipulandum 34. Motor 100 includes a shaft 102 that rotates about an axis A, and an eccentric mass 104 is rigidly coupled to the shaft 102 and thus rotates with the shaft about axis A. In one preferred embodiment, the housing 106 of the motor 100 is coupled to the housing of the interface device 14, e.g. the motor can be attached to the inside of the housing of a handheld gamepad, mouse, or other controller. In other embodiments, the actuator can be coupled to a movable manipulandum, such as a joystick or mouse handle, or other member.

Figure 2B:
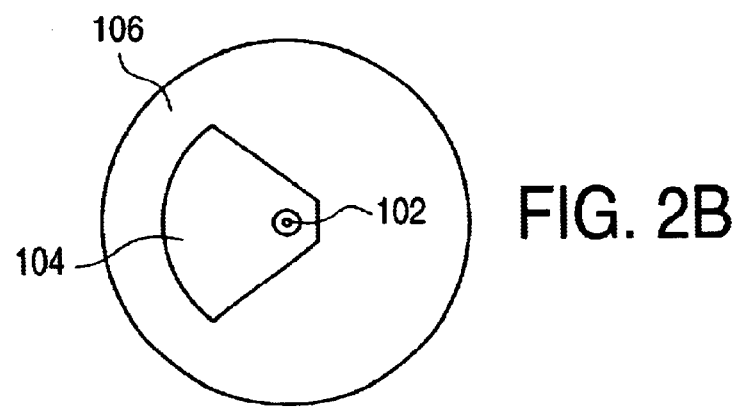
FIGS. 2b and 2c are top plan views of a motor and differently-shaped eccentric masses.
Figure 2C:
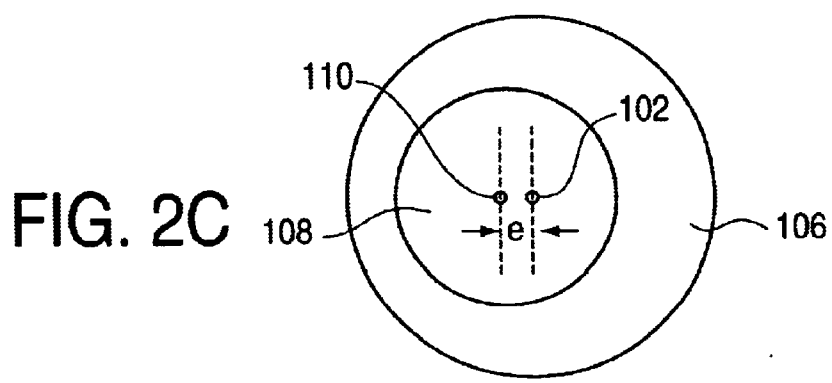

Many different types and shapes of eccentric masses 104 can be used. As shown in FIG. 2b, a wedge- or pie-shaped eccentric can be used, where one end of the eccentric is coupled to the shaft 102 so that most of the wedge extends to one side of the shaft. Alternatively, as shown in FIG. 2c, a cylindrical or other-shaped mass 108 can be coupled to the shaft 102. The center 110 of the mass 108 is positioned to be offset from the axis of rotation A of the shaft 102, creating an eccentricity parameter e that is determined by the distance (offset) between the axis of rotation of the shaft 102 and the center of mass of the mass 108. The e parameter can be adjusted in different device embodiments to provide stronger or weaker vibrations, as desired. For example, the radial force due to the unbalanced rotating mass is given by $F = m * w^2 * e$, where m is the rotating mass, w is the angular velocity, and e is the eccentricity. This relationship predicts that greater magnitude is obtained by changing the eccentricity if the motor is driven constantly in one direction.

When the eccentric mass 104 is rotated by the motor 100, a vibration is induced in the motor and in any member coupled to the motor due to the off-balance motion of the mass. Since the housing 106 of motor 100 is preferably coupled to a housing of a controller or to a movable manipulandum, the vibration is transmitted to the user that is holding the housing or manipulandum. One or more of motors 100 can be included in a device 14 to provide vibrotactile or other haptic feedback; for example, two motors may be used to provide stronger magnitude vibrations and/or vibrations in two different directions.

Implementations for Controlling a Rotating Mass

One objective of the embodiments of the present invention, described below, is to provide vibrotactile device or actuator module which allows independent control over vibration magnitude, frequency, and the shape of the force profile sensed by the user. Emphasis is often placed on providing simple and cost/time effective actuators and mechanisms. The vibration effects produced by these embodiments can often be greatly varied by changing the drive waveform in various ways. Software tools such as Immersion Studio™ from Immersion Corporation can be used to design and provide different vibration waveforms and to determine which output is best for a particular application.

Directional Control

The directional modes of operation described below can be used in any of the embodiments described herein, where applicable, either exclusively, alternately, or in conjunction.

In the more common uni-directional mode of operation, the motor is controlled by a voltage value to rotate the eccentric mass in one direction about the axis of rotation of the shaft. Typically, an on-off drive voltage signal is used, where the duty cycle of the drive signal indicates the actual voltage seen across the motor. The vibration increases in magnitude proportionally with the magnitude of voltage used to control the motor. Strong vibrations can be provided to the user; however, the strength of the vibrations is directly tied to the frequency of the vibration, i.e. the revolutions-per-minute of the eccentric mass about the shaft's axis of rotation, so that the higher the frequency, the higher the vibration magnitude.

A different implementation for controlling a rotating mass provides a bidirectional mode, in which the mass is rotated harmonically or in two directions to provide vibrotactile sensations. The motor can be controlled by a drive waveform that changes between positive and negative signs, thereby changing the direction of rotation of the motor shaft 102 in accordance with the waveform. In one method of operation, the eccentric mass 104 never completes a full rotation, but is instead controlled to oscillate approximately about a single point in its range of motion (a forced harmonic). The eccentric mass thus travels through only a portion of the full range of motion of the shaft before it changes direction and moves in the opposite direction. This causes a vibration in the motor and in any member or housing coupled to the motor as the mass is quickly moved back and forth. The dynamic range of control is much greater in bidirectional mode than in the prior art uni-directional mode, allowing more finely-tuned and precise sensations to be output. Also, this embodiment allows independent control of the magnitude and frequency of the vibrotactile sensations (vibrations/acceleration of the housing), providing a much greater range of sensations to the user. The controller can adjust the magnitude of the drive waveform to correspondingly adjust the magnitude of output vibrations, and the controller adjust the frequency of the drive waveform independently of the amplitude of the drive waveform to adjust the frequency of vibration. This embodiment is described in greater detail in copending application Ser. No. 09/608,125, filed Jun. 30, 2000, entitled, "Controlling Vibrotactile Sensations for Haptic Feedback Devices," and which is incorporated herein by reference. This bi-directional control may be used to drive linear-moving and oscillating masses as described in several of the embodiments described below.

A current-controlled linear amplifier, a voltage-controlled amplifier, and/or a switching amplifier can be used. The drive waveform can be a current waveform or a voltage waveform, depending on the particular amplifier circuit and other circuitry used in a particular implementation. The drive waveform can be supplied by a local controller or circuitry, such as microprocessor 26, by an actuator interface 38, or the host computer 12 can directly supply the voltage (using an amplifier) or a command to supply a desired voltage. For example, a force feedback driver program, API, or application program (or other software layer) running on the host computer can provide an actuator command having independently-controllable magnitude and frequency parameters, where the command is provided in response to an event or interaction in the graphical environment provided by the host. The local microprocessor or other circuitry can receive the command and parameters and, in response, provide a drive signal of the appropriate frequency or magnitude to the actuator(s). Alternatively, a host computer program can provide a drive signal directly to the device and actuator(s), or the local microprocessor can simply transmit and convert the host's signal and provide it to the actuator(s).

Forced harmonic driving may consume significantly higher power than continuous rotation of the motor/mass for the same vibration magnitude. Some of this effect is mitigated by driving the mass near the resonance frequency of the harmonic system (if compliance is provided). In addition (or alternatively), in one embodiment, both uni-directional and bidirectional modes can be used in a single device, alleviating some power consumption as well as providing more compelling haptic sensations. A given actuator's value can be maximized in a device by driving the actuator/eccentric mass continuously to get large magnitude vibrations from 5 to 80 Hz and then switch to a forced harmonic (bi-directional) mode to produce high frequency vibrations. This multi-mode approach can provide higher bandwidth and opens up a whole range of haptic effects. Continuous rotation does not provide independent command of magnitude and frequency, but may still be very compelling in combination with the bi-directional mode. For example, the actuator can be commanded to produce a 10 g 5 Hz vibration with the uni-directional mode, followed a command to produce a high frequency decaying ringing to simulate loss of vehicle control followed by impact with a metal guard rail. Choosing a different combination of motor and mass may allow the crossover frequency to be changed, where one drive mode is switched to the other. A H-bridge amp and a tachometer can be used both to control the velocity in continuous rotation via an external control loop and then use the same motor amp to drive the motor harmonically with independent control of frequency and magnitude. In other embodiments, one actuator in the device 14 can operate in uni-directional mode, and another actuator can operate in bi-directional mode, allowing a uni-directional vibrations to be output at different times or simultaneously.

In a different embodiment, two or more rotary actuators with eccentric masses can be provided and phase control can be used to govern the timing of the rotations. Reinforcement of eccentric forces is controlled to occur along a desired resultant axis, e.g. the rotating eccentric masses are in phase and thus conjunctively accentuating forces in a particular direction. This provides a way to direct the magnitude of vibration in a particular direction. The motors can be controlled to rotate more quickly for a particular portion of the rotary range of the mass, thereby providing more accentuation of forces in the desired direction. By controlling the phase of the motors, a directed magnitude, variable magnitude, and variable frequency can all be provided using an eccentric rotating mass.

In such an embodiment, sensor(s) can be used to detect the position of the motors and control the phase of the motors to provide the directed eccentric forces. In other embodiments, stepper motors can be used, which can be operated in open loop fashion, requiring no sensors to know their current position. In one embodiment, the motors can be oriented so that their axes of rotation are parallel.

Varying Compliance

Some embodiments of the present invention allow the compliance of a suspension that couples the vibrating mass and/or actuator to a ground, such as the device housing, to be varied. In harmonic system including a spring coupled to a mass (ignoring damping for present purposes), the greatest magnitude vibrations are output near a resonance frequency of the system that is determined by the amount of mass and by the compliance of the spring. If the compliance in the system is changed, then the resonant frequency (natural frequency) of the system is changed; if the input drive waveform remains the same, the amplitude of resulting vibrations is reduced due to the new physical properties of the oscillating system, i.e., if a frequency near the old resonant frequency is used, a diminished magnitude is output from the system. A different drive signal frequency near the new resonant frequency can be input to provide the greatest magnitude vibrations. Changing compliance thus allows different magnitudes to be output, and also allows different drive frequencies of vibrations to achieve more efficient high magnitudes.

In one embodiment, active damping may be used, i.e. a force acting as a damper on the mass, the damping force being related to mass velocity. Alternatively, a variable stiffness spring may provide a variable compliance. For example, magnetic field cancellation can be used to vary the stiffness of a magnetic spring. This approach does not require mechanical springs to be used, but uses magnetic properties of magnets and related components ("magnetic springs") instead.

Figure 3A:
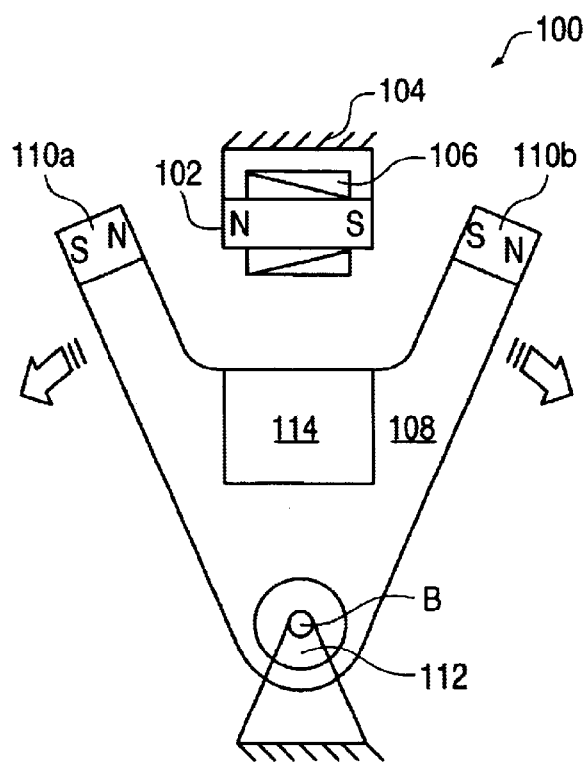
FIG. 3a is a top plan view of a first embodiment of an actuator assembly of the present invention providing a variable compliance between a moving mass and ground.

FIG. 3a is a top plan view of one implementation 100 using magnetic springs. Embodiment 100 provides a magnet 102 grounded to the device's housing 104 with a coil 106 wound around it. A yoke 108 is coupled to a magnet 110a one side and a magnet 110b on its other side, and holds the magnets 110 on each end of the fixed magnet 102. The magnets can be aligned approximately co-axially and can be oriented with north and south facings as shown. The yoke is rotatably coupled to a pivot 112, which is grounded (to the housing, for example), so that the yoke can rotate about an axis B. Current is flowed through the coil 106 from a current source, which can be used to add or subtract from (or cancel) the internal magnetic field between magnets 102 and 110 and which in turn influences the stiffness of the forces between yoke 108 and magnet 102, thereby adjusting the compliance of the suspension between yoke and housing. Current is flowed through the coil 106 as an oscillating (e.g. periodic) waveform to also pulse magnetic forces and cause the yoke 108 to vibrate bidirectionally around the axis B. As for the eccentric mass described above, the yoke is preferably driven an equal distance in both directions so that the yoke over time stays approximately centered surrounding the magnet 102. A mass 114 acts as the inertial mass of the system and is coupled to the yoke 108 to provide vibrotactile forces. Component properties can be adjusted in alternate embodiments to affect output vibrations; for example, a larger mass can be used to provide higher magnitude vibrations. On the fly, the drive signal waveform can be adjusted to adjust magnitude and/or frequency independently, by adjusting the magnitude and/or frequency of the drive waveform.

Figure 3B:
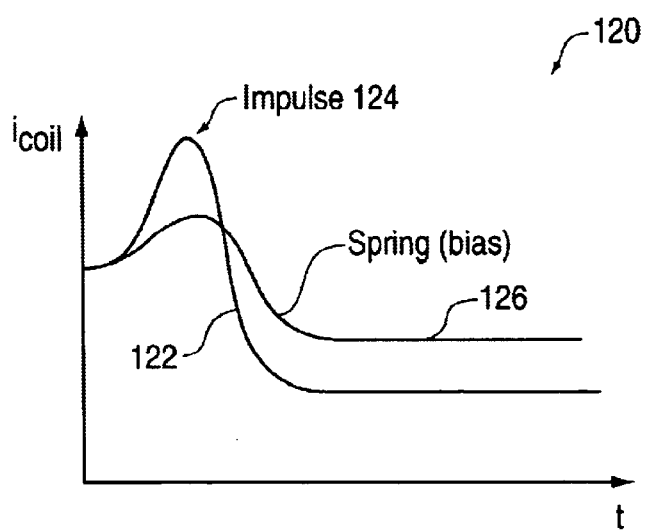

In some embodiments, a complex current profile can be applied to achieve particular results. For example, FIG. 3b is a graph 120 illustrating one example of two different possible current profiles, of current vs. time applied to the coil 106. A first curve 122 showing the application of current includes an initial pulse 124 followed by a DC value (level curve) to sustain a given stiffness. The impulse 124 "plucks" the harmonic system to initiate the oscillation, where the magnetic forces between magnets 102 and 110 cause the yoke 108 to oscillate once it is plucked. The DC level of current sets a desired stiffness or compliance based on the magnetic forces induced by the current (additional impulses may be used to maintain the oscillation over time). This approach can provide a highly non-linear spring with very high stiffness at the limits of travel of the yoke. This non-linearity is a desirable feature since it lets the mass be driven at a high frequency without hitting the limits to yoke motion, which would cause disturbances in the output vibration. A second curve 126 shows another example of an initial pulse (AC current) for starting the oscillation and a DC level that sets a stiffness or compliance level for the system.

Figure 4A:
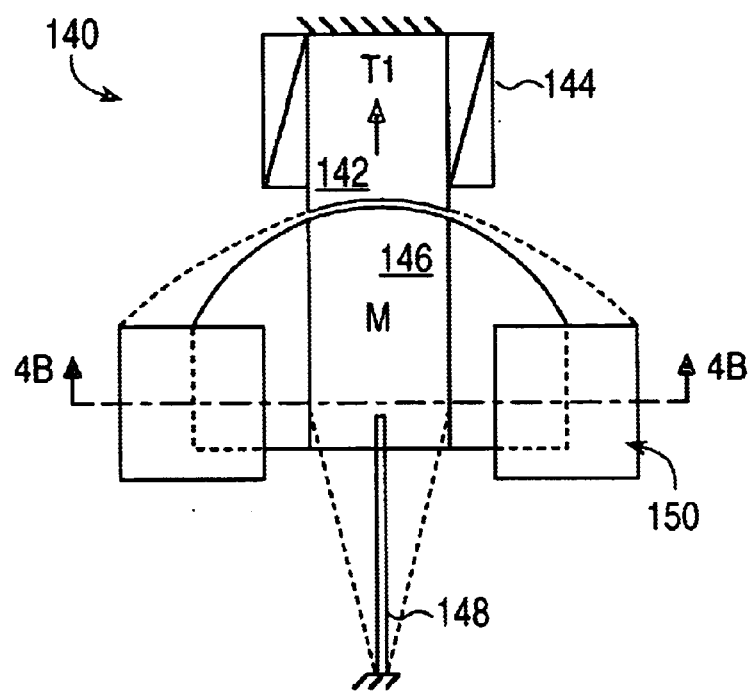
FIGS. 4a and 4b are side elevational and top plan views, respectively, of a second embodiment of an actuator assembly of the present invention providing a variable compliance between a moving mass and ground.
Figure 4B:
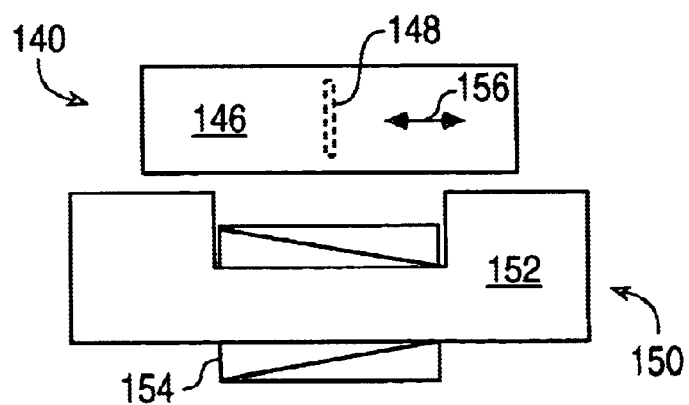

FIG. 4a is a side elevational view and FIG. 4b is a top plan sectional view of another embodiment 140 for an actuator assembly providing a variable compliance between the moving mass and the housing or ground. In this embodiment, the tension of a flexibly-connected pendulous mass is varied and the mass is moved using two actuators. Assembly 140 includes a core 142, which can be made of steel or other ferromagnetic material. A tensioner coil 144 is wrapped around the core 142. Separate from the core 142 is a pendulous mass 146, which is also a magnet and is suspended by a flexure 148. Flexure 148 is a relatively compliant member with minimal stiffness (such as plastic) and is coupled to a ground. An excitation actuator 150 is grounded and includes a core 152 (e.g. made of steel) and a coil 154 (best seen in FIG. 4b).

In operation, the tension of the magnetic pendulous mass 146 is varied by varying the current in coil 144 and thus varying the magnetic attractive force between the core 142 and the mass 146. The tension force T1 that radially pulls and attracts the mass 146 to the core 142 has a direct effect on the tension or compliance of the flexure 148. The excitation actuator 150 is used to drive the mass 146 harmonically by flowing the proper oscillating current through the coil 154. The compliance of the flexure 148 as well as the magnetic forces cause the mass to move back and forth as shown by arrow 156. The tension or compliance is adjusted using tensioner coil 144 to change the restoring force in the flexure and the resonance (natural) frequency of the system, thus causing a different magnitude of vibration to be output to the user contacting the housing for a given waveform. For example, a higher tension provides a higher natural frequency, which provides a higher magnitude at that signal frequency. In one sense, this embodiment is similar to a pendulum mass in a variable gravity field. An advantage of this embodiment is that the tensioner actuator can be designed with a large tension force range and the second actuator can efficiently drive the spring/mass pendulum at its natural frequency with relatively little power required. This embodiment may make complex vibration waveforms possible because the frequency and magnitude of the vibrations can be independently changed in real time by adjusting the tension on the mass.

Figure 5A:
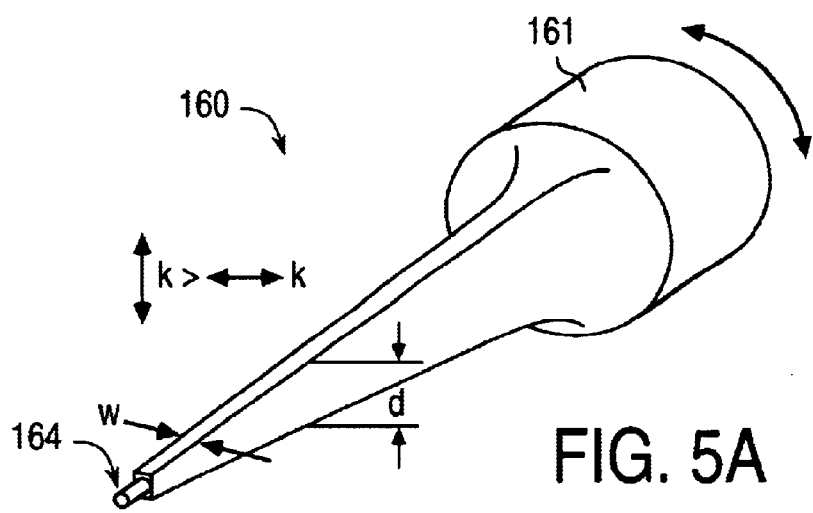
FIG. 5a is a perspective view of a component of a third embodiment of actuator assembly.

FIG. 5a is a perspective view of a component 160 of another embodiment of an actuator assembly that provides a varying compliance between the moving mass and ground. Component 160 is a prismatic flexible beam having a variable cross section depending on where the cross section is taken. Beam 160 includes a base portion 161 which is coupled to an actuator (see below), a beam portion 162, and an end 164 where a mass is coupled. Beam portion 162 has a variable cross section and is shown, in the described embodiment, as a tapering member that has a tapering width w and depth d, varying from a greater amount at base 160 to a lower amount at end 164. The flexibility or spring constant k is different in the "up-down" direction (as oriented shown in the Figure) than in the side-to-side direction due to the different dimensions of w and d.

Figure 5B:
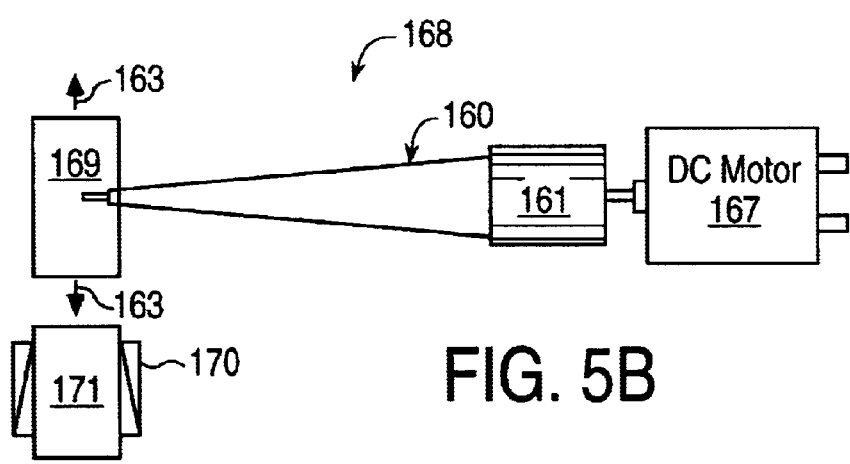
FIG. 5b is a side elevational view of the third embodiment of an actuator assembly of the present invention providing a variable compliance between a moving mass and ground.
Figure 5C:
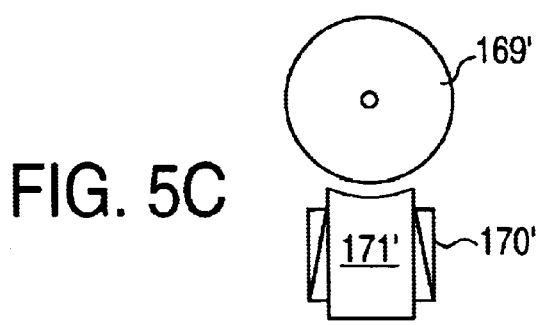
FIG. 5c is a side elevational view of an alternate embodiment of an actuator and mass of the embodiment of FIG. 5b.

FIG. 5b illustrates an actuator assembly 168 including the cantilever beam 160 shown in FIG. 5a and including two actuators. A DC motor 167 (or other type of rotary actuator) is grounded and has a rotating shaft coupled to the base portion 161 of the beam 160. The motor 167 thus can rotate the beam 160 as controlled by signals to the motor. A mass 169 is coupled to the end 164. In the described embodiment, the mass 169 is a magnet which interacts with a magnetic field generated by a grounded core 171 and coil 170 that is wrapped around the core 171 and which has a current flowing therethrough. By providing current as a forcing function through the coil (e.g., a sine wave or other periodic waveform having positive and negative directions), the mass 169 can be driven in two directions as shown by arrows 163. The motion of the mass 169 generates vibrotactile sensations in the housing of the device. FIG. 5c illustrates an alternative embodiment in which the mass 169' has a curved outer surface that matches a curvature of the core 171.'

To change the compliance between mass and housing, the beam 160 can be rotated by motor 167. For example, if the beam is rotated, the neutral bending axis changes, e.g., a different thickness of beam portion 162 will be oriented in the up-down direction of mass motion and actuator force and the material's preferred bending axis is no longer vertical. This provides a different spring constant (stiffness) in the direction of mass motion, thereby providing a different compliance and natural frequency for vibration, and allowing vibrations of different magnitude and/or frequency to be output at the natural frequency. The beam 160 can be rotated in small steps to provide an almost continuously variable compliance and thus a finely-adjustable vibration magnitude and frequency. In other embodiments, the beam is not tapered, but is made rectangular.

Figure 6:
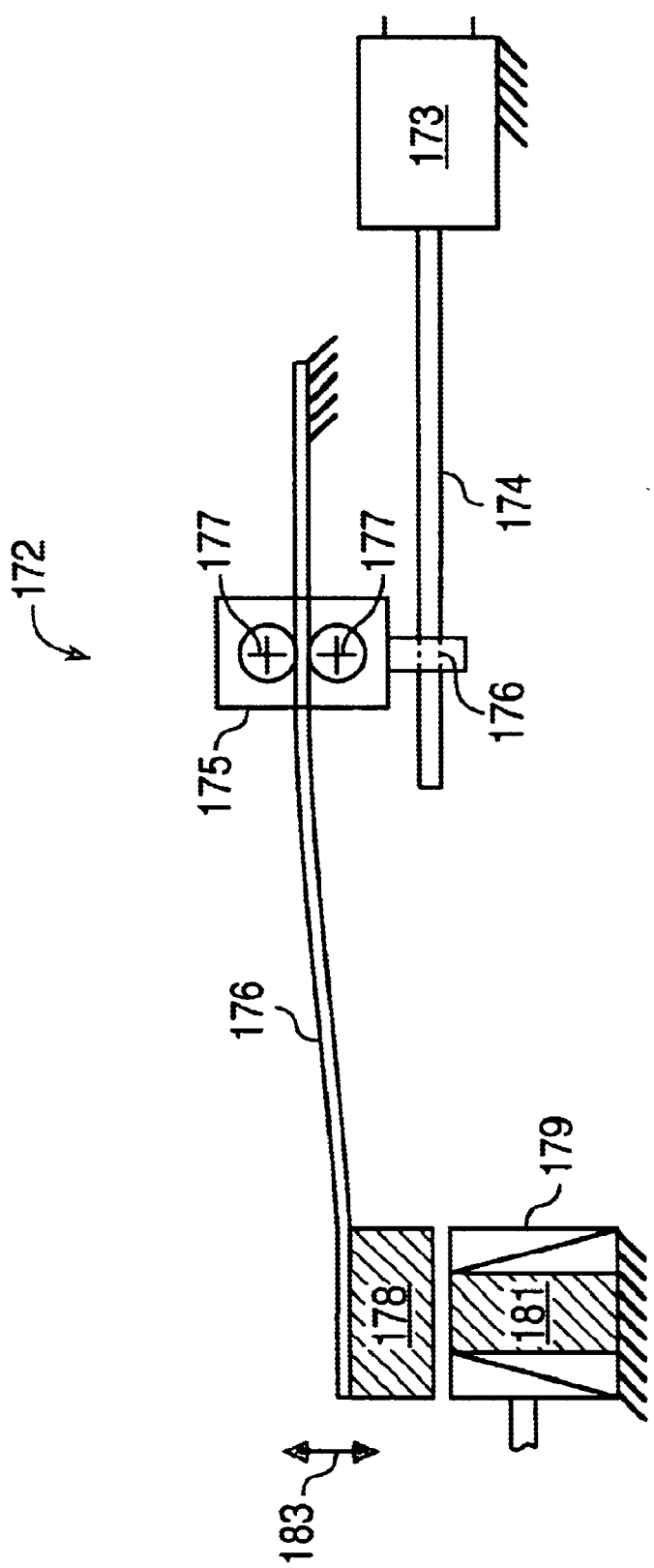
FIG. 6 is a side elevational view of a fourth embodiment of an actuator assembly of the present invention providing a variable compliance between a moving mass and ground.

FIG. 6 is a schematic view of a different embodiment 172 of an actuator assembly which provides a variable flexibility between mass and housing. A grounded rotary actuator 173 rotates a lead screw 174. A clamp 175 is coupled to the lead screw 174 at a threaded bore 176 in the clamp so that the clam 175 moves along the lead screw as the screw is rotated. A cantilever 176 is grounded at one end, is threaded through rollers 177 or other clamp elements, and is coupled to a magnetic mass 178 at its other end. A coil 179 and core 181 are grounded and positioned adjacent to the mass 178. When a current is flowed through the coil 179, the magnetic force causes the mass 178 to move; driving current having a forcing function causes the mass 178 to move back and forth as shown by arrows 183, causing a vibration in the housing. This configuration allows independent control over frequency and magnitude of the vibrations when inputting different drive waveforms. The cantilever 176 is flexible and bends to allow the mass 178 to move. Operating a second order system at the natural frequency is very power efficient because it takes very little energy to keep a harmonic motion going. The system may also be driven off of the resonant peak frequency.

Clamp 175 can be moved by actuator 173 to change the compliance of the cantilever 176. When clamp 175 is moved to a new position, rollers 177 pinch the cantilever at a different position and effective change the flexible length of the cantilever, thereby providing a different stiffness/compliance and changing the natural frequency of the system. For example, the closer that clamp 175 is moved to the mass 178, the lower the magnitude and the greater the frequency of the resulting vibrations. Alternatively, the coil and core, or a separate additional actuator, can be provided to "pluck" the beam to start it resonating. In other embodiments, a tension mechanism like a solenoid connected to a wire which pulls on the beam, can be used to change the restoring forces on the beam and thereby alter the beam stiffness.

Adjusting Mass and Eccentricity

The resonant frequency of a system including a rotating eccentric mass can be controlled by altering the eccentricity and/or center of mass of the rotating mass in the system, instead of a compliance as described above. Increasing eccentricity for a continuous (uni-directional) rotation can boost vibration magnitude, but this change may decrease the magnitude of vibrations output by the same actuator when the actuator is driven by a forcing function. Increasing the mass of the moving element (i.e., changing the center of mass to be further from the axis of rotation) can increase the magnitude and lower the frequency of vibrations for a given forcing function, and decreasing the mass produces the opposite effect. Some low-cost mechanisms of the present invention for changing the mass on the fly are described below.

Figure 7A:
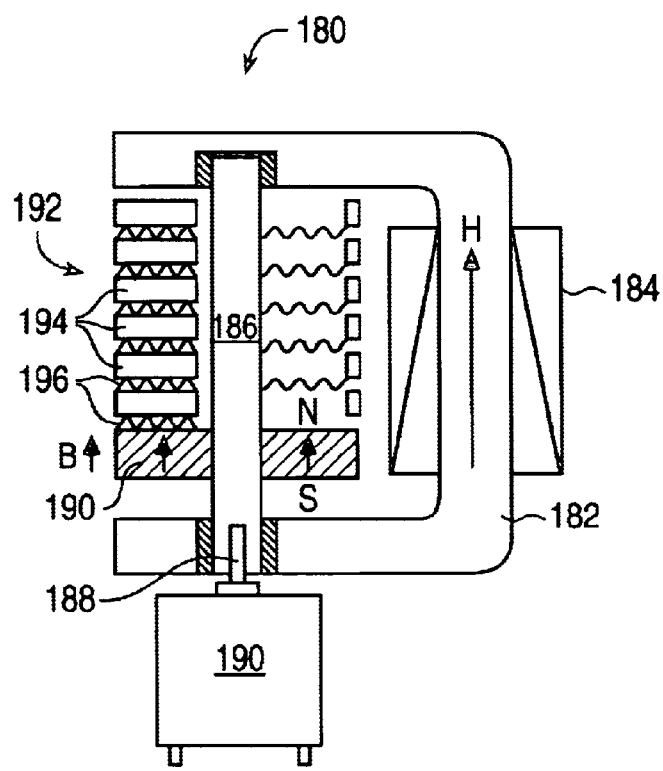
FIG. 7a is a side elevational view of a first embodiment of an actuator assembly of the present invention providing a variable eccentricity of a moving mass.
Figure 7B:
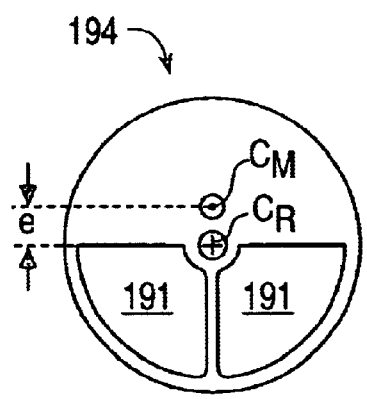

FIG. 7a is a side elevational view of one embodiment 180 of a variable mass actuator system for producing vibrotactile sensations. A metal core 182 is grounded to the housing or other ground feature. A coil 184 is wrapped around a portion of the core 182 to provide a magnetic field when current is flowed through the coil. A shaft 186 (e.g., made of plastic) is rotatably coupled between two extensions of the core 182. The shaft 186 is coupled to the rotating shaft 188 of an actuator 190, such as a DC motor, such that when the actuator rotates its shaft 188, the shaft 186 also rotates. A magnet 190 is rigidly coupled to the shaft 186 and rotates with the shaft. The magnet 190 has a magnetic north-south orientation as shown. A stack 192 of magnetically permeable discs 194 are loosely coupled around the shaft 186 between the magnet 190 and one extension of the core 182. The discs 194 can be made of steel or other metal, and preferably the discs have an offset center of mass that provides an eccentricity. A small layer 196 of compliant friction material, such as rubber foam, is placed on one side of each disc 194 (and on the magnet 190, if necessary) so that a layer 196 is positioned between each disc (and between the magnet and the nearest disc to the magnet). For example, as shown in FIG. 7b, each disc can be provided with two areas 191 on a portion of the disc that have less material, thus providing a center of mass $C_M$ that is offset from the center of rotation $C_R$. Each disc can be manufactured by die stamping.

The stack 192 is compressed together by a variable magnetic field created by the core 182 and current flowed in the coil 184, where the current is varied to vary the magnetic field. When a low current is flowed through the coil 184, the discs 194 are loosely engaged to each other and to the magnet 190, so that when shaft 186 is rotated, only magnet 190 (and not discs 194) are rotated, thus providing a rotating mass having a mass of the magnet (the magnet can also have an offset center of mass). However, when the current is increased, the H-field increases, and the discs are compressed together more gradually and progressively. When the magnetic field is strong enough to compress the discs together and to the magnet 190, friction from layers 196 causes a sufficient frictional force between the layers and between the magnet and its adjacent layer. At that point, when the shaft 186 is rotated by the motor 190, the magnet 190 is also rotated, and the frictional force causes the entire stack 192 to rotate with the magnet. This effectively increases the mass of the rotating element and changes the magnitude and frequency of the vibration. Thus, one of two effective masses can be selected using the current in coil 184 to output two discrete vibrations.

This variable compression technique can be used to create a variable mass eccentric rotating system or a variable center of mass. The masses may be gradually engaged. In some embodiments, the discs and magnet can be rotated out of phase and thus create an intentional imbalance in more than one axis for a particular vibration effect. In some embodiments, surface finish on the discs and compliant layer material type can be selected by the designer so that as compression force is increased in the stack 192, only some discs are engaged with the magnet 190 while other discs remain floating (e.g., discs furthest from the magnet may remain loosely coupled). This would allow other mass values between the magnet mass and the full stack mass to be selected using current in coil 194 and thus allow greater variation in vibration magnitude and frequency. For example, as many mass values could be selected as the total number of discs 194 plus magnet 190.

Figure 8A:
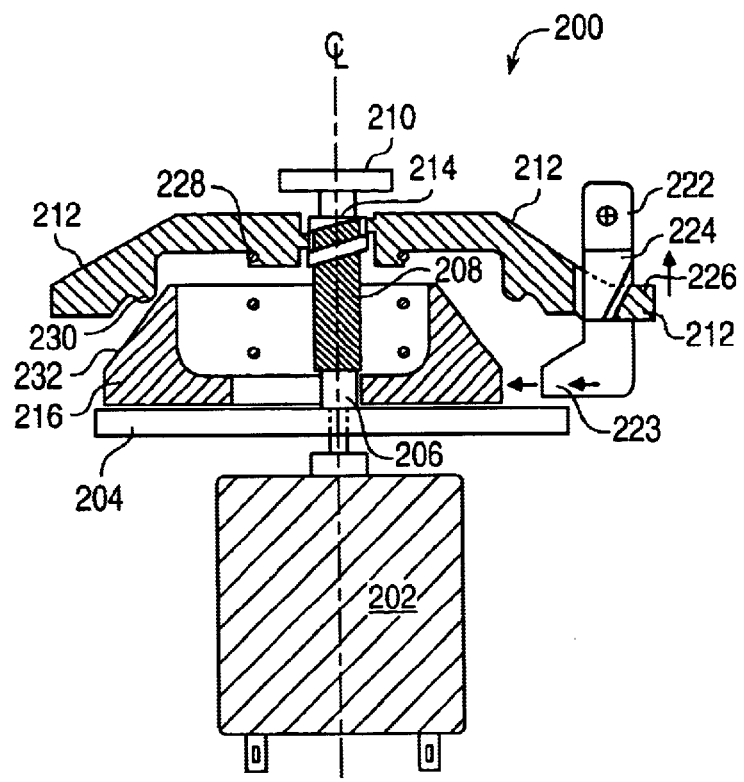
FIG. 8a is a side elevational view of a second embodiment of an actuator assembly of the present invention providing a variable eccentricity of a moving mass.

FIG. 8a is a side elevational view of a different actuator assembly 200 of the present invention allowing the eccentricity of a rotating mass to be changed and selected on the fly using only one actuator that provides both mass rotation and eccentricity selection. By changing the eccentricity of the mass, the magnitude of housing vibrations can be adjusted as explained above. A multi-position, discretely selectable, eccentric mass is used, as explained below.

Figure 8B:
Figure 8C:
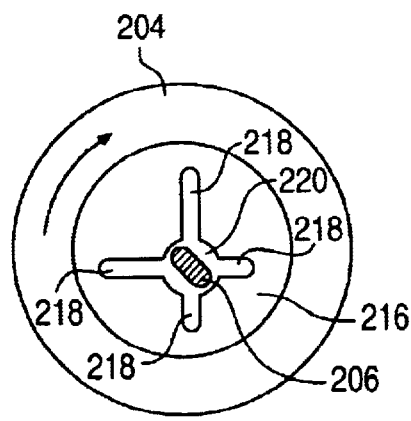

A grounded motor 202 has a rotating shaft that is rigidly coupled to a rotating spindle 204. A flat keyed hub 206 of the spindle extends above the surface of a flat spindle portion; a cross section of the flat key portion 206 is shown in FIG. 8b. A shaft portion 208 of the spindle 204 extends up from the flat spindle portion and a lead screw 210 is coupled to the spindle shaft portion 208, allowing the spindle to act on a centering platen 212. The centering platen 212 includes a threaded portion 214 which engages threads of the lead screw 210. An eccentric slotted disc 216 is positioned loosely around the shaft portion 208 and flat keyed hub 206 of the spindle 204. The slotted disc 216 is shown in overhead view in FIG. 8c, and has a number slots 218 extending radially from the center aperture 220 of the disc, where the center aperture 220 is made large enough to accommodate the keyed hub 206 as shown. Four slots 218 are shown in FIG. 8c, each slot a different length, and each slot wide enough so that the narrow dimension of hub 206 can slide therein if aligned with the slot. The disc 216 can have other shapes and have different numbers of slots in other embodiments.

A foot 222 is pivotably coupled to ground near the edge of the spindle 204 and disc 216, and includes a sloped portion 224 that is positioned above a corresponding sloped portion 226 of the platen 212. A spring 228 is positioned between the platen 212 and the disc 216 to provide spring bias between the platen and disc.

In operation, the assembly 200 causes the disc 216 to lock into place in different positions, thus providing different eccentricities. The actuator 202 is caused to rotate the spindle 204 in one direction, such as clockwise. This causes the platen 212 to raise, which in turn causes the portion 226 of the platen to engage the sloped portion 224 of the foot 222. This engagement causes the tip 223 of foot 222 to pivot inward and move the disc 216 so that the keyed hub 206 moves into one of the slots 218 that is aligned with the narrower dimension of the keyed hub. The disc need not be moved the entire length of a slot 218, since centripetal force during rotation will force the disc to move any remaining length. The motor is then rotated clockwise to cause the disc 216 to rotate with the spindle. The thread of the platen eventually runs off of the shaft, allowing continuous rotation of the mass and vibrations to the output. Since the center of the disc 216 is not aligned with the axis of rotation of the motor shaft, an eccentric force is produced, which is transmitted to the housing (ground) and to the user. The disc remains in place during rotation due to centripetal force. The foot 222 is preferably located as to not interfere with rotation in its pushed-in position.

The keyed hub 206 selectively engages one of the slots 218 at a time. If a different eccentricity is desired to be selected, then the motor is reversed in direction, e.g. counterclockwise. As a result of the spindle 208 rotating counterclockwise, platen 212 moves downward toward the spindle 208 and disc 216, and a protrusion 230 engages a sloped surface 232 of the disc 216, causing the disc to re-center about the axis of rotation. The motor and hub 206 can then be rotated to align a different slot 218 of the disc 216 with the keyed hub 206. In a preferred embodiment, a sensor can be employed to sense the amount of rotation of the hub and thus determine how much to rotate the hub 206 to align it with a slot 218 (e.g., a four-position sensor can be used). Any type of sensor can be used, such as an optical encoder or analog potentiometer.

This embodiment has the advantage of using a single motor to both spin an eccentric mass (uni-directionally) and to select the eccentricity of the mass, thus saving the cost of providing additional actuators.

Figure 9A:
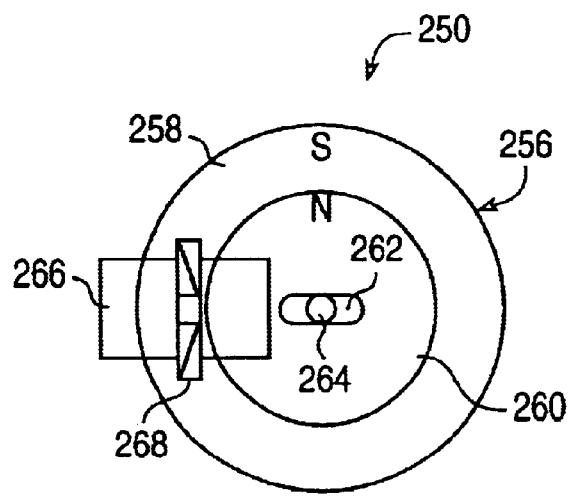
FIGS. 9a and 9b are top plan and side elevational views, respectively, of a third embodiment of an actuator assembly of the present invention providing a variable eccentricity of a moving mass.
Figure 9B:
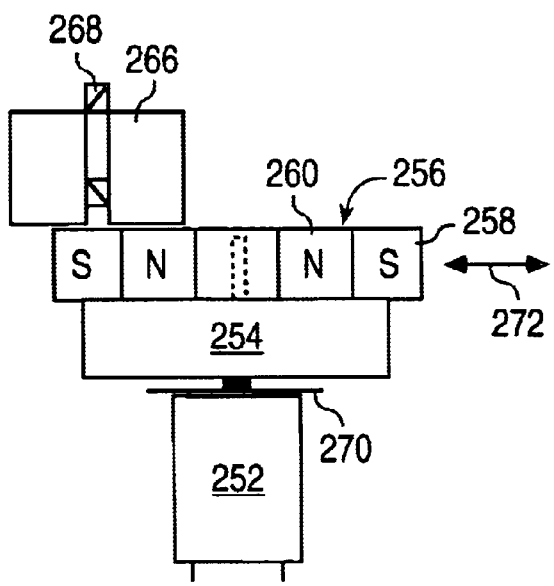

FIGS. 9a and 9b are top plan and side elevational views, respectively, of another embodiment 250 of an actuator assembly providing a mass with a varying eccentricity. An actuator 252, such as a DC motor, is rigidly coupled to a friction hub 254. A two-pole ring magnet 256 is coupled to the friction hub. The hub 254 is also preferably ferromagnetic, allowing a magnetic normal force to couple the hub 254 and ring magnet 256 together. The ring magnet 256 includes a south pole section 258 surrounding a north pole interior section 260. A slot 262 is provided in the north pole section 260 and a pin 264 that is coupled to the shaft of motor 252 extends through the slot 262. A steel core stator 266 is grounded in a position above the magnet 256, and a coil 268 is wrapped around the core 266. An encoder 270, tachometer, or other type of sensor can be provided to track the position of the motor shaft.

In operation, the friction hub and ring magnet 256 act as an eccentric mass on the rotation of the motor shaft. The slot 262 in the magnet 256 allows the magnet to slide in either direction as indicated by arrow 270. Current can be flowed in coil 268 to cause magnetic forces to move the ring magnet 256 with respect to the friction hub 254, overcoming the coupling forces between the hub and ring magnet. Thus, these magnetic forces can be used to move the ring magnet to a new desired position that provides a different eccentricity to the rotating mass. In one embodiment, the ring magnet is continually forced off center; forces are applied during rotation to vary the eccentricity. Thus the magnitude of the vibration can be continuously varied by varying magnet position and eccentricity. In other embodiments, the position of the ring magnet with respect to the hub can be changed at discrete times, such as between rotation times or alternatively on the fly during operation, to provide a discrete constant eccentricity. In some embodiments, encoder 270 can feed back motor velocity to a controller such as an embedded microprocessor. The velocity can be used to hold the angular velocity of the entire rotating part constant as the mass is moved in and out to change magnitude. Thus, much of the control of the assembly 250 is provided in the software or firmware of such a controller. This approach, with the addition of a sensed index location, may allow one to profile the resultant waveform. A high force and relatively large stroke of the moving magnet type actuator can allow rapid changes in magnet position on the motor's concentric hub.

Figure 10:
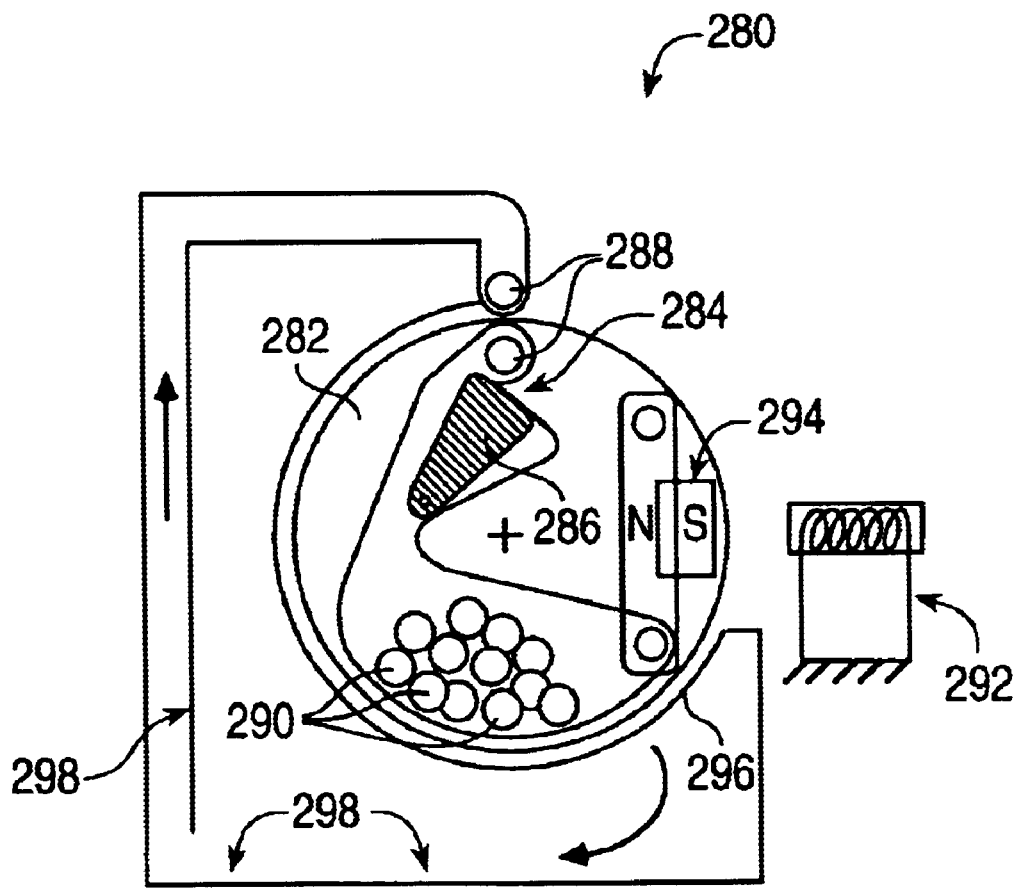
FIG. 10 is a side elevational view of a fourth embodiment of an actuator assembly of the present invention providing a variable eccentricity of a moving mass.

FIG. 10 is a top plan view of another embodiment 280 of an actuator assembly allowing the center of mass of a rotating mass to be adjusted on the fly. A hopper 282 is coupled to a rotating shaft of an actuator (not shown). The hopper includes an inertial inlet valve 284 which normally remains closed during rotation, e.g., a pivoting member 286 is moved by centripetal force and blocks the inlet valve. If the hopper is stopped rotating, the member 286 moves to open the inlet. This causes one or more balls 288 to roll into the hopper and join any existing balls 290 already in the hopper. This increases the mass of the hopper, thus changing the mass value of the rotating mass to allow a different magnitude of vibration to be output.

A grounded coil and core 292 is placed adjacent to a magnet 294 coupled to the hopper and pivotably coupled to a outlet 296. When the coil is energized with current, the magnet 294 pivots and the outlet is opened, allowing balls 290 to leave the hopper 282. This allows the mass value of the hopper to be decreased to a desired amount, changing the center of mass of the hopper. Preferably, the hopper 282 is slowed or stopped to allow the balls to exit the hopper. Any balls that exit are returned to the inlet opening 284 by a return 298. In operation, balls 290 and 288 are allowed to enter the hopper to increase the mass of the hopper by controlling the rotation of the hopper and the inertial inlet 284. Balls are allowed to exit the hopper to decrease mass by controlling the outlet actuator 292 and 294.

In an alternate embodiment, balls can be placed in a rotating cup. In some embodiments, the balls can be suspended in viscous oil. The positions of the balls in the cup are controlled by an external electromagnet that influences the balls in a non-contact scheme. The balls can thus be positioned at various locations to increase or decrease eccentricity, as desired. In some embodiments, a similar structure can be extended to a more general mass transfer within a closed disc volume. An electromagnet may pump heavy ferro-fluid from one chamber close to the spin axis into another that is located farther from that axis, thus increasing the mass value at the edge of the rotating mass and changing the center of mass.

Figure 11A:
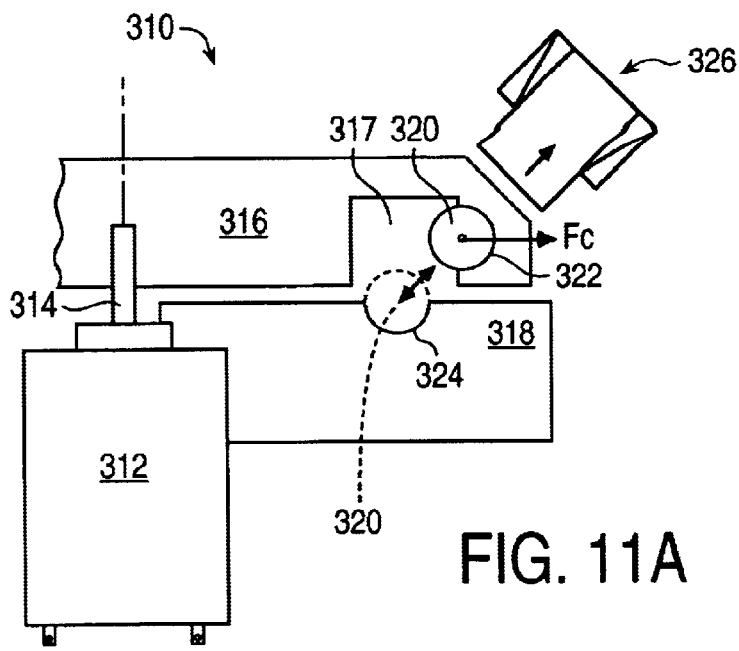
FIG. 11a is a side elevational view of a fifth embodiment of an actuator assembly of the present invention providing a variable eccentricity of a moving mass.
Figure 11B:
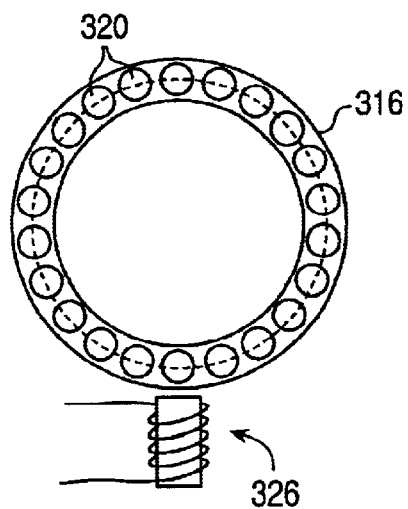
Figure 11C:
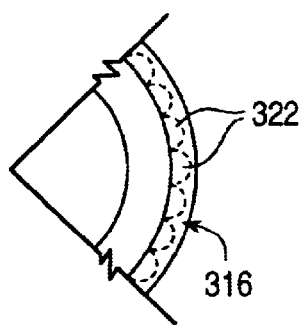
FIG. 11c is a top plan view of a portion of the rotating disc shown in FIG. 11b.

FIG. 11a is a side elevational view of another embodiment 310 of an actuator assembly providing a variable eccentricity (here, center of mass) of a rotating mass. A grounded DC motor 312 has a rotating shaft 314 that is coupled to a rotating disc 316, e.g. made of plastic. A grounded stationary disc 318 (which can also be made of plastic) is positioned under the rotating disc 316. Grounded stationary disc 318 includes a groove 324 which can hold one or more balls 320. An electromagnet 326 or solenoid, having an iron core and a coil, is used FIG. 11b is a top plan view of the rotating disc 316, and shows a number of steel balls 320 positioned in the disc 316. The rotating disc has a pocket 317 cut on its underside around its outer circumference with a multiplicity of spherical pockets 322 cut into the outside wall of this pocket. FIG. 11c shows a section of rotating disc 316 and the spherical pockets 322.

The steel balls 320 rest in the stationary disc 318 within groove 324. Electromagnet 326 is positioned adjacent to the rotating disc at such a distance such that when the electromagnet is energized, a ball is pulled up from the groove 324 into one of the spherical pockets 322. When the disc 316 rotates from the motor 312 being energized, centripetal acceleration keeps the balls 320 in place within the spherical pockets 322. A controller such as a microprocessor can "push" and "pop" balls 320 out of the rotating disc 316 by reading a sensor (not shown), such as an encoder, that detects the position of the motor shaft or disc 316 and allows the microprocessor to determine the current position of the disc 316. In other embodiments, the electromagnet 326 can determine whether a ball is in a particular socket 322 that is currently aligned with the electromagnet, thus allowing the electromagnet to act as a sensor. For example, the coil can sense the passage of the ball since the ball causes a change in flux which causes a voltage on the coil.

By selectively pulling balls into the pockets 322 while the disc is rotating, it is possible to load the disc 316 with even or uneven distributions of mass, essentially altering the center of mass and total spinning mass in real time. The solenoid actuator can also in some embodiments force balls out of the pockets and back into the groove 324 as the disc is rotating, by reversing current in the coil.

Figure 12:
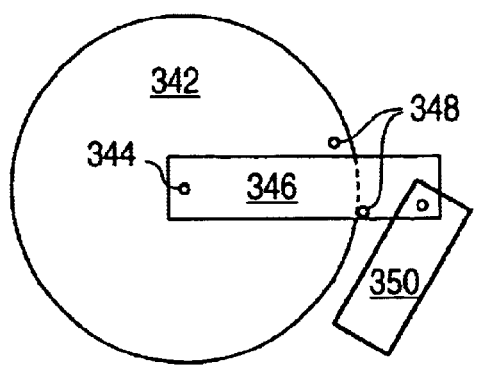
FIG. 12 is a top plan view of a sixth embodiment of an actuator assembly of the present invention providing a variable eccentricity of a moving mass.

FIG. 12 is a top plan view of another embodiment 340 of an actuator assembly providing a variable eccentricity to a rotating mass. A rotating disc 342 is coupled to an actuator shaft 344 and is rotated by an actuator (not shown), such as a DC motor. An arm 346 is rotatably coupled to the actuator shaft and is limited in motion by stop pins 348 that are coupled to the disc 342. Arm 346 thus rotates with the disc 342. A mass 350 is pivotably coupled to the arm 346. The mass is preferably connected to the arm in an offset manner (e.g., closer to one side of the mass than the other) such that when the arm 346 is rotated in one direction, the mass trails the arm at one distance from the axis of rotation, and when the arm is rotated in the other direction, the mass trails the arm at a different distance from the rotation axis. This creates different eccentricities depending on the direction of rotation, and allows two different discrete magnitudes of vibration to be produced by the rotating mass. This embodiment can also be extended to a series of such mechanisms that are stacked or placed adjacent to each other, each mechanism having its own rotation speed threshold at which point the mass moves from a closed position to an open position forced by the centripetal force. Each mechanism can have its own mass or placement to create a different eccentricity and vibration magnitude.

In a related embodiment, a rotating mass is located on a cylindrical motor hub and is coupled to the hub by a friction clutch. The mass stays locked in one position when the motor is operated in a first direction, providing a particular eccentricity. Reversing the motor direction to a second direction repositions the outer mass to provide a different eccentricity, and the motor is again operated in the first direction to lock the mass at the new eccentricity. This is a way of varying the vibration magnitude by stopping the motor momentarily to reposition the mass.

Figure 13:
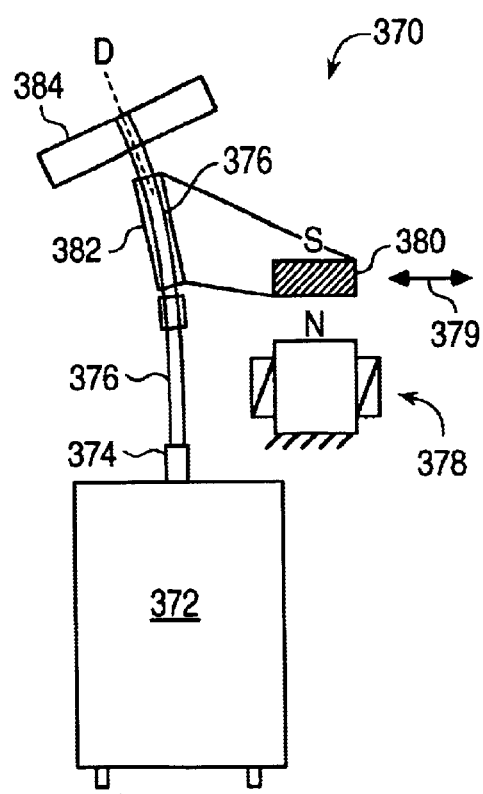
FIG. 13 is a side elevational view of a seventh embodiment of an actuator assembly of the present invention providing a variable eccentricity of a moving mass.

FIG. 13 is a side elevational view of another embodiment 370 of an actuator assembly providing a variable eccentricity to a rotating mass. A grounded rotary actuator 372 has a rotating shaft 374 that is coupled to a flexible rod 376. A grounded coil and core 378 is positioned adjacent to the rod 376 and a magnet 380 is positioned above the core and coil 378. Magnetic forces resulting from flowing a current in the coil cause the magnet 380 to move in either direction as shown by arrow 379. Magnet 380 is coupled to a sleeve 382 by a coupling such as a plastic member. Rod 376 extends through the sleeve 382 and is coupled to a mass 384. The mass 384 in some embodiments can be weighted to be eccentric relative to the axis of rotation of the rod 376.

In operation, the actuator 372 rotates the rod 376 which rotates the mass 384 about axis D (which moves with the rod), where the rod 376 rotates within the sleeve 382. The magnet 380 is moved based on current flowed in the core/coil 378, such that the sleeve 382 is moved in conjunction with the magnet 380. This causes the rod 376 to bend to a degree based on the movement of the magnet 380. Changing the amount of bend in the rod 376 changes an eccentricity and rotation direction of the mass. The changed bend allows a different magnitude and/or direction of vibration to be output.

Other Embodiments

Figure 14:
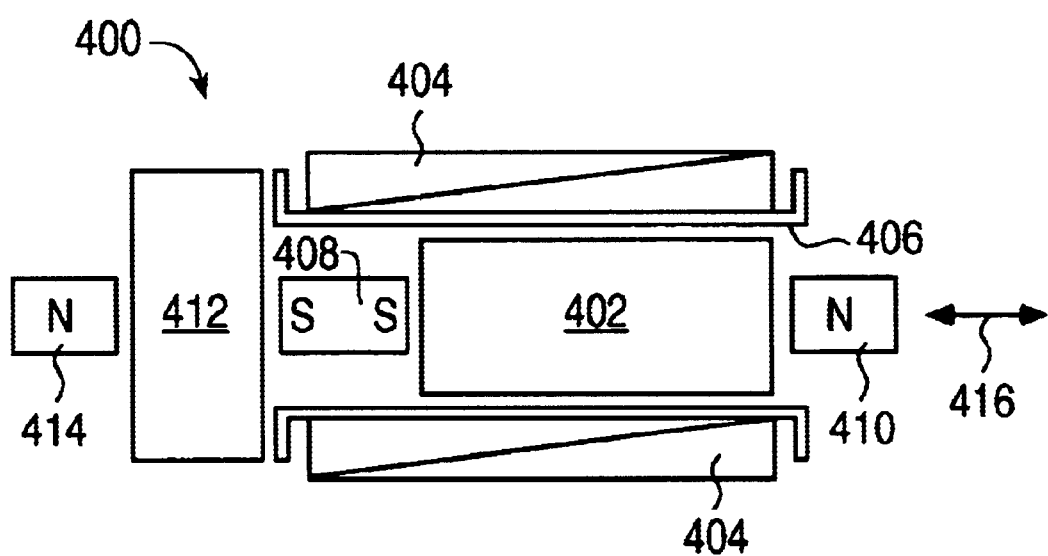
FIG. 14 is a schematic view of a solenoid of the present invention providing vibrotactile sensations.

FIG. 14 is a schematic diagram of a solenoid embodiment 400 of an actuator assembly which provides linear oscillations and vibrations to the housing of an interface device. A core 402 made of iron or steel is positioned between a coil 404 wrapped around a cylindrical housing 406. A south pole magnet 408 is positioned on one side of the core 402, and a north pole magnet 410 is positioned on the other side of the. core 402. A core end 412 is made of iron or steel and is positioned adjacent to the south pole magnet 408. Another north pole magnet 414 is positioned on the other side of the core end 412. The two north pole magnets 410 and 414 at the ends of the assembly act as non-linear springs which center the south pole magnet 408 within the coil 404.

The external magnetic field from the coil 404, caused by flowing current therethrough, is used to move the magnets 402 and 408 and core 402 linearly, as shown by arrow 416. By oscillating the current in the coil, these parts are oscillated, producing a vibration. The input current can be varied in magnitude and frequency to vary the magnitude and frequency of the resulting output vibrations.

Other embodiments can provide a single north pole magnet on one end of the assembly 400. In another embodiment, a solenoid with mechanical springs can be used to bias the moving core to a center position. It can be advantageous in such an embodiment to provide a large mass that is positioned internal to the coil. For example, open-cell foam can be used to provide the centering bias.

In another embodiment, a gyroscope can be provided in a housing. Disturbing the gyroscope generates forces. The gyroscope can provide large magnitude forces for a relatively small motor and mass. In some embodiments, a motor can be running continuously in a gimbal. Small actuators can be used to disturb the frame and create reaction torques which are felt by the user as vibrations. The gyroscopic motion can effectively provide a large mass which the small actuators can react. In some embodiments, two or more such gyroscope motors can be used.

While this invention has been described in terms of several preferred embodiments, it is contemplated that alterations, permutations and equivalents thereof will become apparent to those skilled in the art upon a reading of the specification and study of the drawings. For example, the various embodiments disclosed herein can provide vibrotactile forces in a wide variety of types of interface devices, handheld or not. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A haptic feedback device for providing vibrotactile sensations to a user, said haptic feedback device coupled to a host computer and comprising:

a housing grasped by said user;

a first actuator coupled to said housing;

a mass, wherein said mass can be oscillated by said actuator, and wherein a coupling provided between said first actuator and said mass or between said mass and said housing has a compliance that can be varied, wherein varying said compliance allows vibrotactile sensations having different magnitudes for a given drive signal to be output to said user grasping said housing, wherein said compliance is provided by a flexure coupling said mass to said housing, wherein said first actuator is grounded to said housing and moves said mass which includes a magnet; and a second actuator, said second actuator being grounded and providing a magnetic force on said mass to provide a variable tension in said flexure.

2. A haptic feedback device as recited in claim 1 wherein said compliance is contributed by a magnetic spring provided between said first actuator and said mass.

3. A haptic feedback device as recited in claim 2 wherein said first actuator includes a magnet and a coil, and wherein said mass is coupled to a pivoting member, said pivoting member including at least one magnet that is moved by a magnetic field of said first actuator.

4. A haptic feedback device as recited in claim 1 wherein said haptic feedback device is a gamepad controller, said gamepad controller receiving information from said host computer which determines when said vibrotactile sensations are to be output based on events occurring within a graphical environment implemented and displayed by said host computer.

5. A haptic feedback device for providing vibrotactile sensations to a user, said haptic feedback device coupled to a host computer and comprising:

a housing grasped by said user;

an actuator coupled to said housing; and a mass, wherein said mass can be oscillated by said actuator, and wherein a coupling provided between said actuator and said mass or between said mass and said housing has a compliance that can be varied, wherein varying said compliance allows vibrotactile sensations having different magnitudes for a given drive signal to be output to said user grasping said housing, wherein said compliance is provided by a flexible member coupled between said mass and said housing, wherein said actuator moves said mass using a magnetic field produced by said actuator and wherein a compliance of said flexible member can be varied by moving a pair of grounded pincher rollers along a length of said flexible member.

6. A haptic feedback device as recited in claim 5 when said flexible member is a tapered member and is coupled to a rotary actuator that is coupled to said housing, wherein said rotary actuator rotates said tapered member about its lengthwise axis to provide a variable compliance between said mass and said housing.

7. A haptic feedback device as recited in claim 5 wherein said pincher rollers are moved by a second actuator coupled to said housing.

8. A haptic feedback device for providing vibrotactile sensations to a user, said haptic feedback device coupled to a host computer and comprising:

a housing grasped by said user;

a rotary actuator coupled to said housing; and an eccentric mass coupled to and rotatable by said actuator about an axis of rotation, said eccentric mass having an eccentricity that can be varied relative to said axis of rotation while said mass is rotating, wherein varying said eccentricity allows vibrotactile sensations having different magnitudes for a given drive signal to be output to said user grasping said housing, wherein said eccentric mass includes a plurality of discs slidably coupled to, a rotating shaft that is coupled to said actuator, wherein a magnetic field is controlled to cause a desired number of said discs to frictionally engage with said shaft to provide a desired eccentricity of said mass.

9. A haptic feedback device as recited in claim 8 wherein said magnetic field is provided by a second actuator that includes a coil, a core, and a magnet, two ends of said core provided on either end of said shaft, and said magnet rigidly coupled to said shaft, wherein one of said discs engages said magnet and said other discs engage each other.

10. A haptic feedback device for providing vibrotactile sensations to a user, said haptic feedback device coupled to a host computer and comprising:

a housing grasped by said user;

a rotary actuator coupled to said housing; and an eccentric mass coupled to and rotatable by said actuator about an axis of rotation, said eccentric mass having an eccentricity that can be varied relative to said axis of rotation while said mass is rotating, wherein varying said eccentricity allows vibrotactile sensations having different magnitudes for a given drive signal to be output to said user grasping said housing, wherein said mass includes a slotted member having a plurality of different slots radiating from a center aperture in said slotted member, at least two of said slots having a different length, wherein said actuator rotates a spindle having a keyed portion that engages in one of said slots to provide a desired eccentricity to said mass.

11. A haptic feedback device as recited in claim 10 wherein said spindle is coupled to a centering platen, said centering platen being moved by said actuator toward said slotted member to cause said slotted member to move such that said keyed portion is positioned in said center aperture of said slotted member, wherein said slotted member can then be rotated to allow said keyed portion to engage in a different one of said slots.

12. A haptic feedback device as recited in claim 10 further comprising a grounded kick foot, said kick foot moving said slotted member such that said keyed portion engages one of said slots.

13. A haptic feedback device for providing vibrotactile sensations to a user, said haptic feedback device coupled to a host computer and comprising:

a housing grasped by said user;

a rotary actuator coupled to said housing; and an eccentric mass coupled to and rotatable by said actuator about an axis of rotation, said eccentric mass having an eccentricity that can be varied relative to said axis of rotation while said mass is rotating, wherein varying said eccentricity allows vibrotactile sensations having different magnitudes for a given drive signal to be output to said user grasping said housing, wherein said mass includes a hopper that encloses a plurality of balls, and wherein an inlet to said hopper can be opened to allow additional balls to move inside said hopper and change a distance between a center of mass of said hopper and said axis of rotation, thereby change said eccentricity of said mass.

14. A haptic feedback device as recited in claim 13 wherein an outlet is provided in said hopper to allow one or more of said balls to leave said hopper, said outlet controllable by a separate controller.

15. A haptic feedback device for providing vibrotactile sensations to a user, said haptic feedback device coupled to a host computer and comprising:

a housing grasped by said user;

a rotary actuator coupled to said housing; and an eccentric mass coupled to and rotatable by said actuator about an axis of rotation, said eccentric mass having an eccentricity that can be varied relative to said axis of rotation while said mass is rotating, wherein varying said eccentricity allows vibrotactile sensations having different magnitudes for a given drive signal to be output to said user grasping said housing, wherein said mass includes a rotating disc having a plurality of sockets, and wherein at least one ball can be pulled into one of said sockets by a selective magnetic field, thereby changing a distance between a center of mass of said rotating disc and said axis of rotation to change said eccentricity of said mass.

16. A haptic feedback device as recited in claim 15 wherein said at least one ball is one of a plurality of balls provided in a groove, wherein a desired number of said balls can be pulled into corresponding sockets of said rotating member to provide a desired eccentricity of said mass.

17. A method for providing vibrotactile sensations for an interface device coupled to a host microprocessor, the method comprising:

rotating an eccentric mass about an axis of rotation with force provided by an actuator coupled to a housing of said interface device; and varying an eccentricity of said eccentric mass relative to said axis of rotation while said mass is rotating, wherein varying said eccentricity allows vibrotactile sensations having different magnitudes for a given drive signal to be output to said user grasping said housing, wherein said varying an eccentricity includes moving a rotating keyed portion into a slot of a slotted member, said slotted member having a plurality of different slots radiating from a center aperture in said slotted member, at least two of said slots having a different length.

18. A method as recited in claim 17 further comprising a circuit for driving said actuator in two directions, said circuit receiving a drive signal and causing said actuator to oscillate said eccentric mass about said axis of rotation and induce a vibration in said housing.

19. A method as recited in claim 17 wherein said varying an eccentricity includes using a magnetic field to cause a plurality of rotating discs to frictionally adhere to each other.

20. A haptic feedback device as recited in claim 17 wherein said mass includes a ring magnet coupled to a hub, wherein a magnetic field is provided to move said ring magnet relative to said axis of rotation and relative to said hub to vary said eccentricity.

21. A haptic feedback device as recited in claim 17 wherein said mass includes a hopper that encloses a plurality of balls, and wherein an inlet to said hopper can be opened to allow additional balls to move inside said hopper and change a distance between a center of mass of said hopper and said axis of rotation, thereby change said eccentricity of said mass.

* * * * *

UNITED STATES PATENT AND TRADEMARK OFFICE
CERTIFICATE OF CORRECTION

PATENT NO. : 6,693,622 B1
APPLICATION NO. : 09/643898
DATED : February 17, 2004
INVENTOR(S) : Erik Shahoian et al.

It is certified that error appears in the above-identified patent and that said Letters Patent is hereby corrected as shown below:

On the title page, insert item [63]:

Add the following to the face of the patent under the heading Related U.S. Application Data -- U.S. Provisional Application No. 60/149,782, filed Aug. 18, 1999 and continuation-in-part of U.S. Patent Application No. 09/608,125, filed Jun. 30, 2000, which claims priority to U.S. Provisional Application No. 60/142,155, filed Jul. 1, 1999. --

In the written description:

Col. 1, line 45, change "connect ed" to -- connected --;
Col. 1, line 53, delete "simple";
Col. 1, line 57, delete "in many current game con-";
Col. 1, line 58, delete the entire line;
Col. 1, line 59, delete "the Nintendo 64," and "are";
Col. 1, line 60, delete "of the controller and which";
Col. 1, line 63, delete "of the controller";
Col. 1, line 64, delete "(console unit)";
Col. 1, line 65, delete "to the controller";
Col. 2, line 1, delete line;
Col. 2, line 2, delete line;
Col. 2, line 3, delete line;
Col. 2, line 4, delete line;
Col. 2, line 5, delete line;
Col. 2, line 6, delete line;
Col. 2, line 7, delete line;
Col. 2, line 8, delete line;
Col. 2, line 9, delete line;
Col. 5, line 40, delete "." after "group";
Col. 10, line 10, insert -- by -- after "followed";
Col. 10, line 49, insert -- a -- after "In";
Col. 13, line 20, change "claim" to -- clamp --;
Col. 18, line 66, delete "."; and

UNITED STATES PATENT AND TRADEMARK OFFICE
CERTIFICATE OF CORRECTION

PATENT NO. : 6,693,622 B1
APPLICATION NO. : 09/643898
DATED : February 17, 2004
INVENTOR(S) : Erik Shahoian et al.

It is certified that error appears in the above-identified patent and that said Letters Patent is hereby corrected as shown below:

Col. 20, line 57, replace 'to,a" with -- to a --.

Signed and Sealed this

Seventh Day of August, 2007

JON W. DUDAS
*Director of the United States Patent and Trademark Office*